May 15, 1951 G. W. HOPKINS 2,552,789
KEY-RESPONSIVE CYCLE INITIATING MEANS
Filed Sept. 20, 1946 18 Sheets-Sheet 1
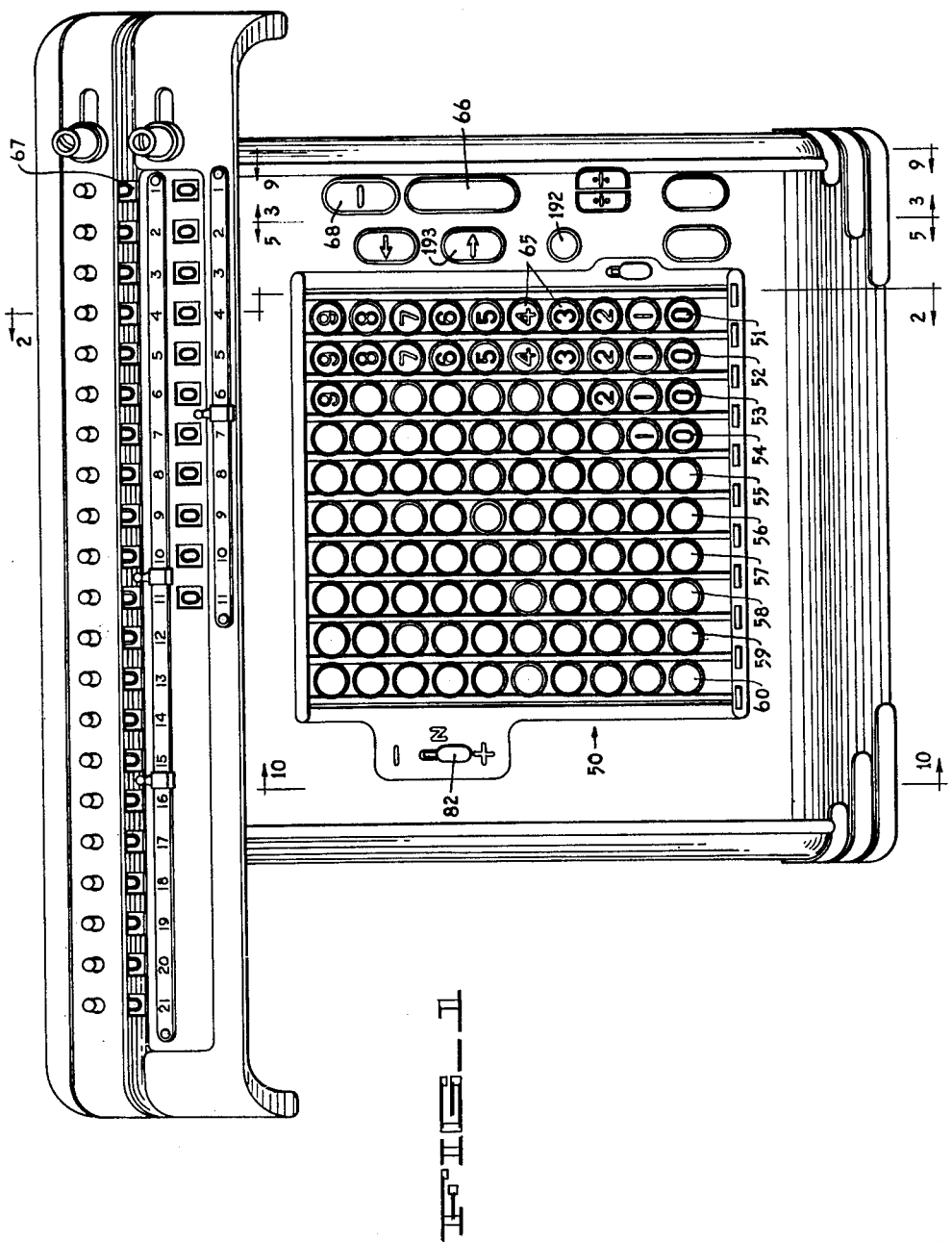
INVENTOR May 15, 1951 G. W. HOPKINS 2,552,789
KEY-RESPONSIVE CYCLE INITIATING MEANS
Filed Sept. 20, 1946 18 Sheets-Sheet 2
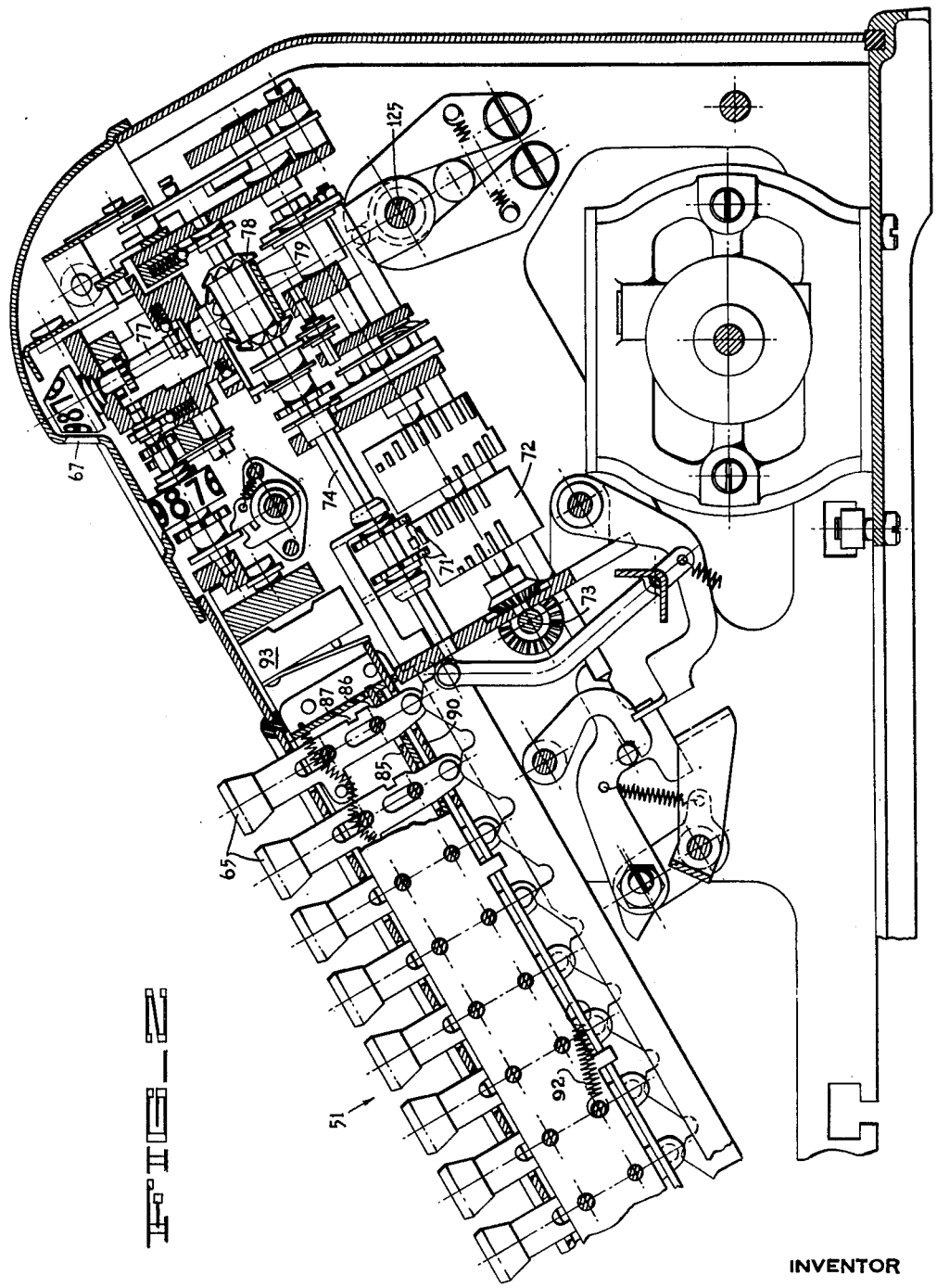
INVENTOR

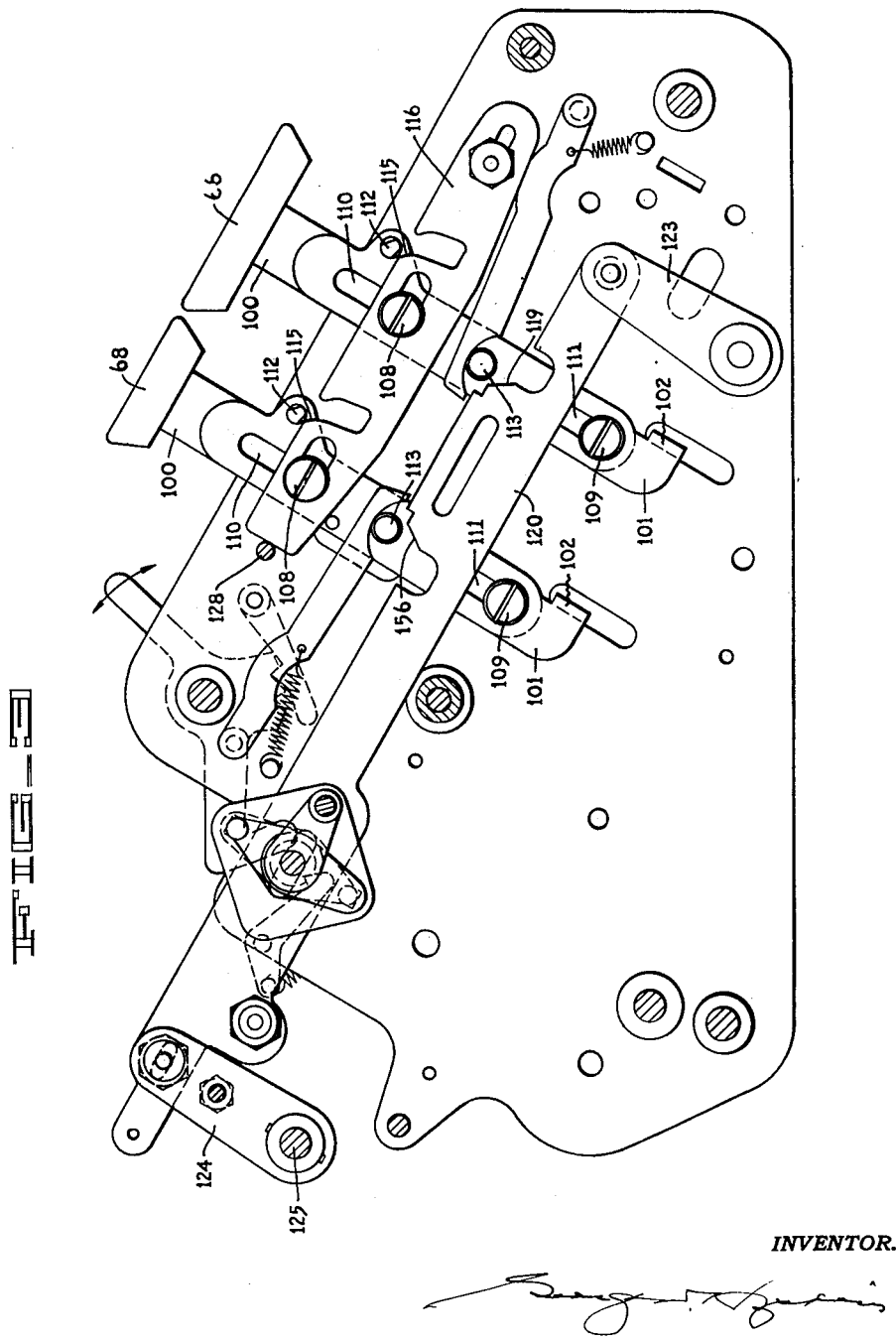

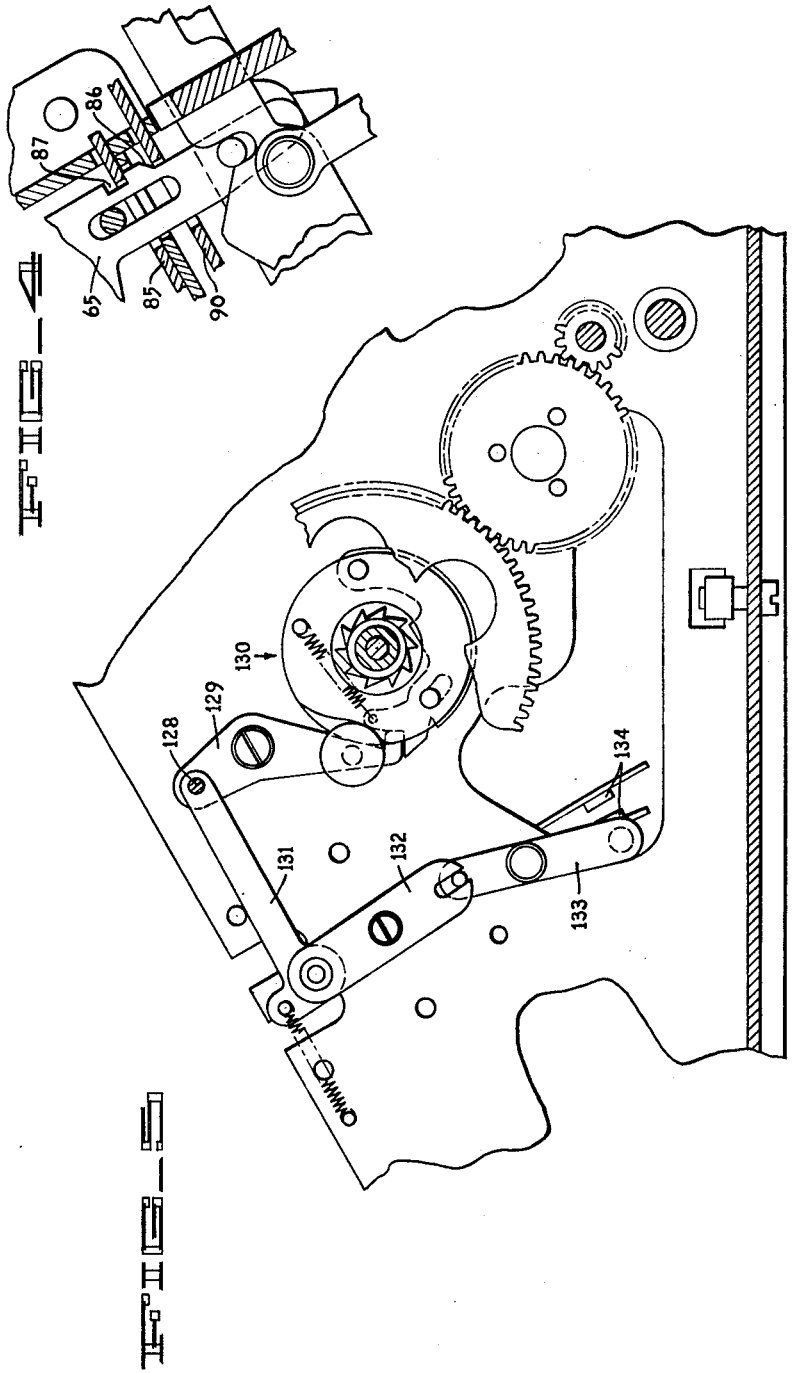

May 15, 1951     G. W. HOPKINS     2,552,789
KEY-RESPONSIVE CYCLE INITIATING MEANS
Filed Sept. 20, 1946     18 Sheets-Sheet 5
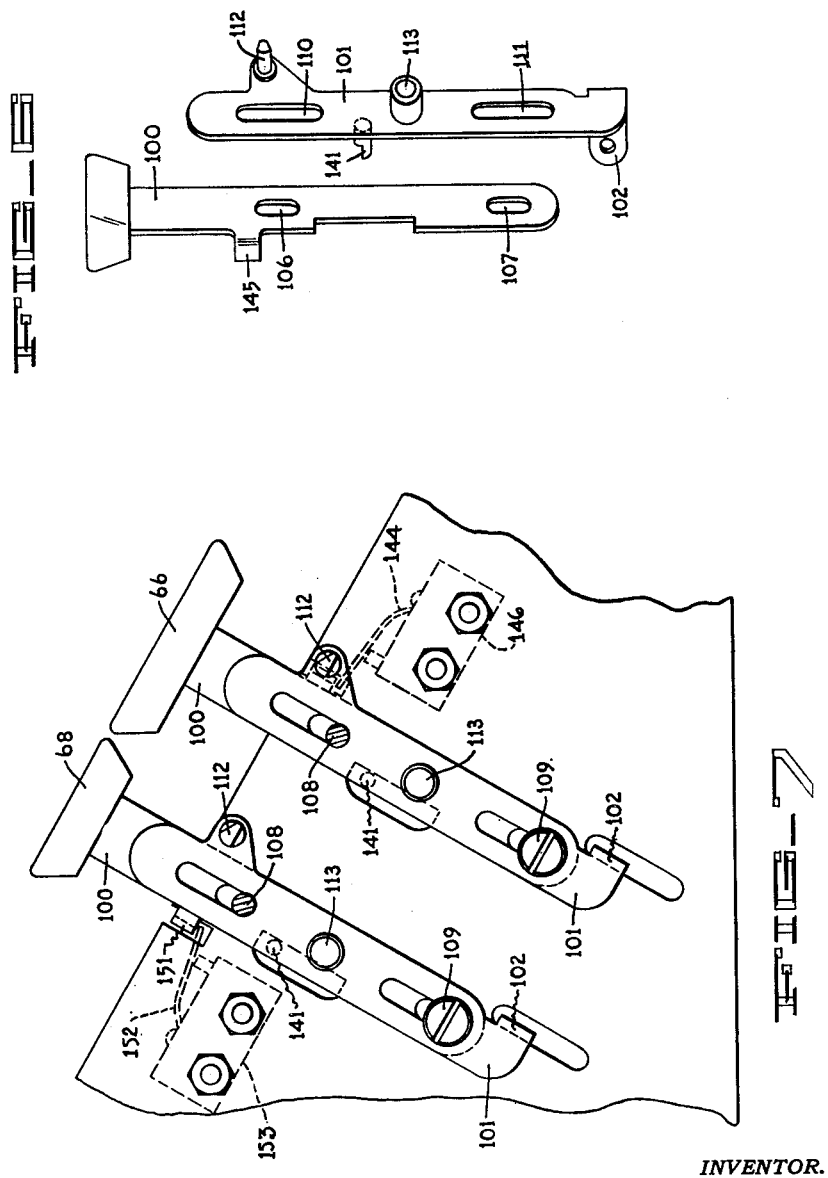
*INVENTOR.*

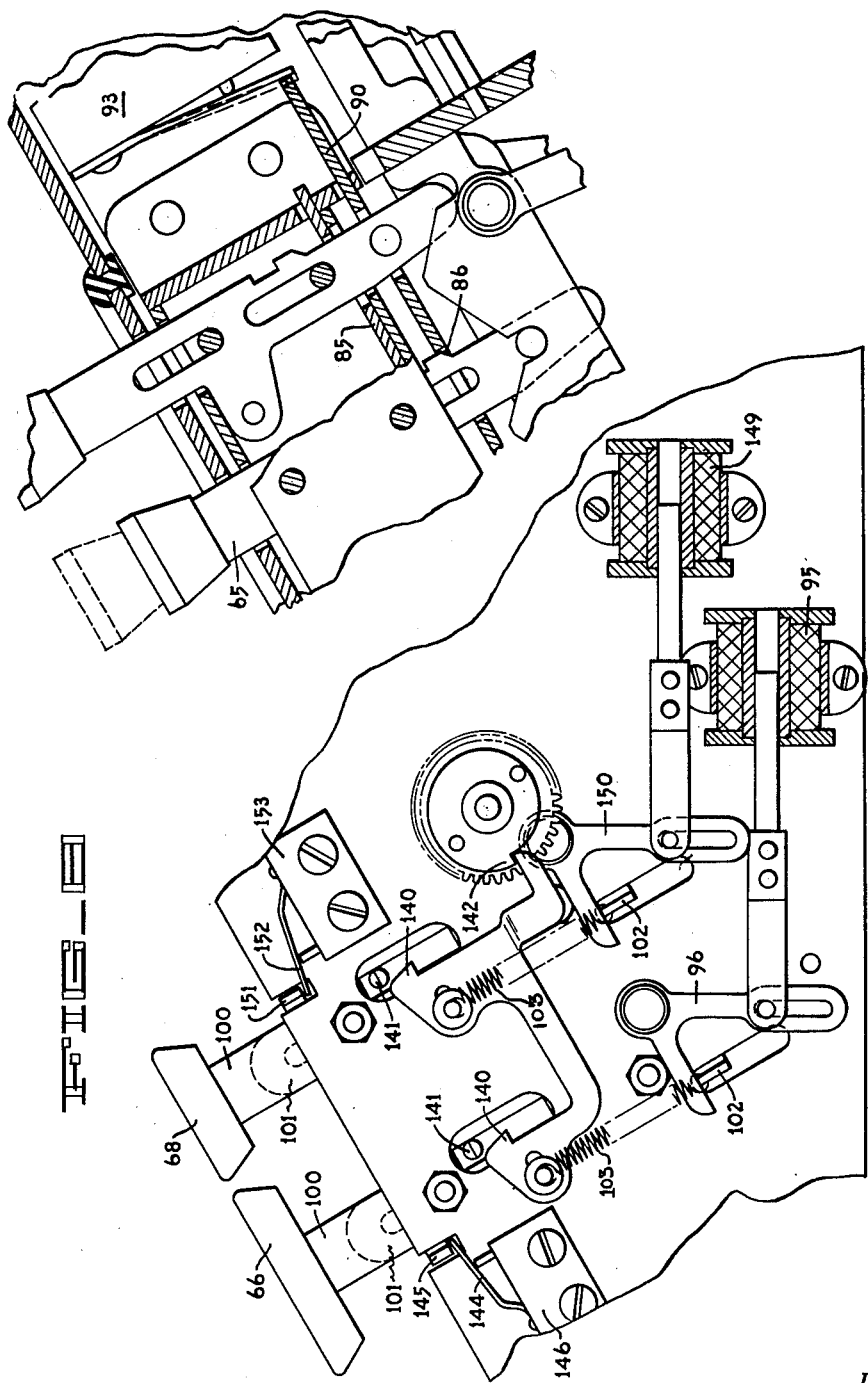

May 15, 1951 G. W. HOPKINS 2,552,789
KEY-RESPONSIVE CYCLE INITIATING MEANS
Filed Sept. 20, 1946 18 Sheets-Sheet 7
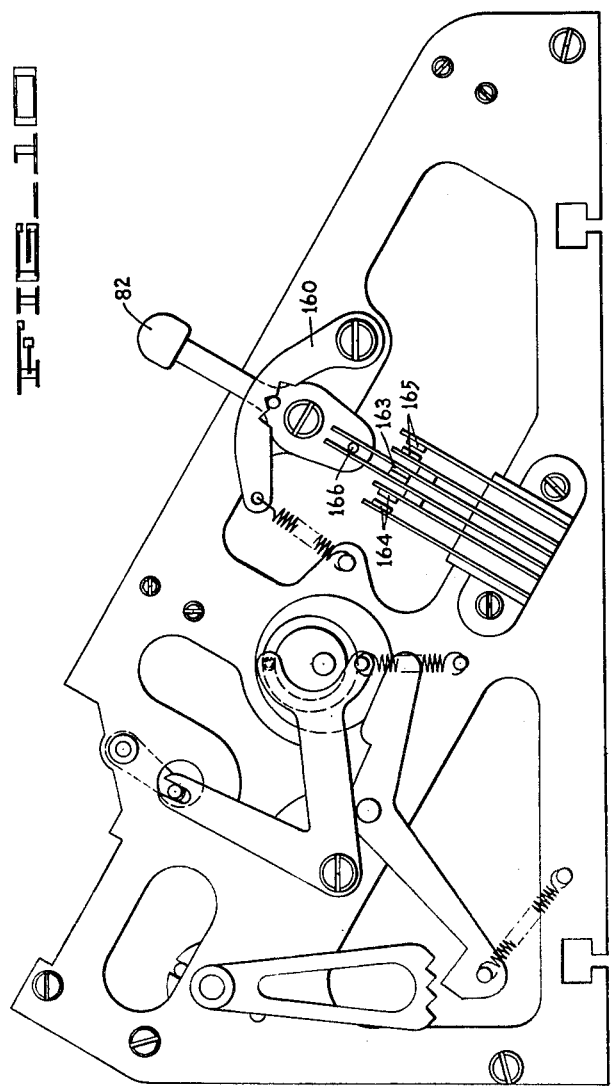
INVENTOR.

May 15, 1951 G. W. HOPKINS 2,552,789
KEY-RESPONSIVE CYCLE INITIATING MEANS
Filed Sept. 20, 1946 18 Sheets-Sheet 8
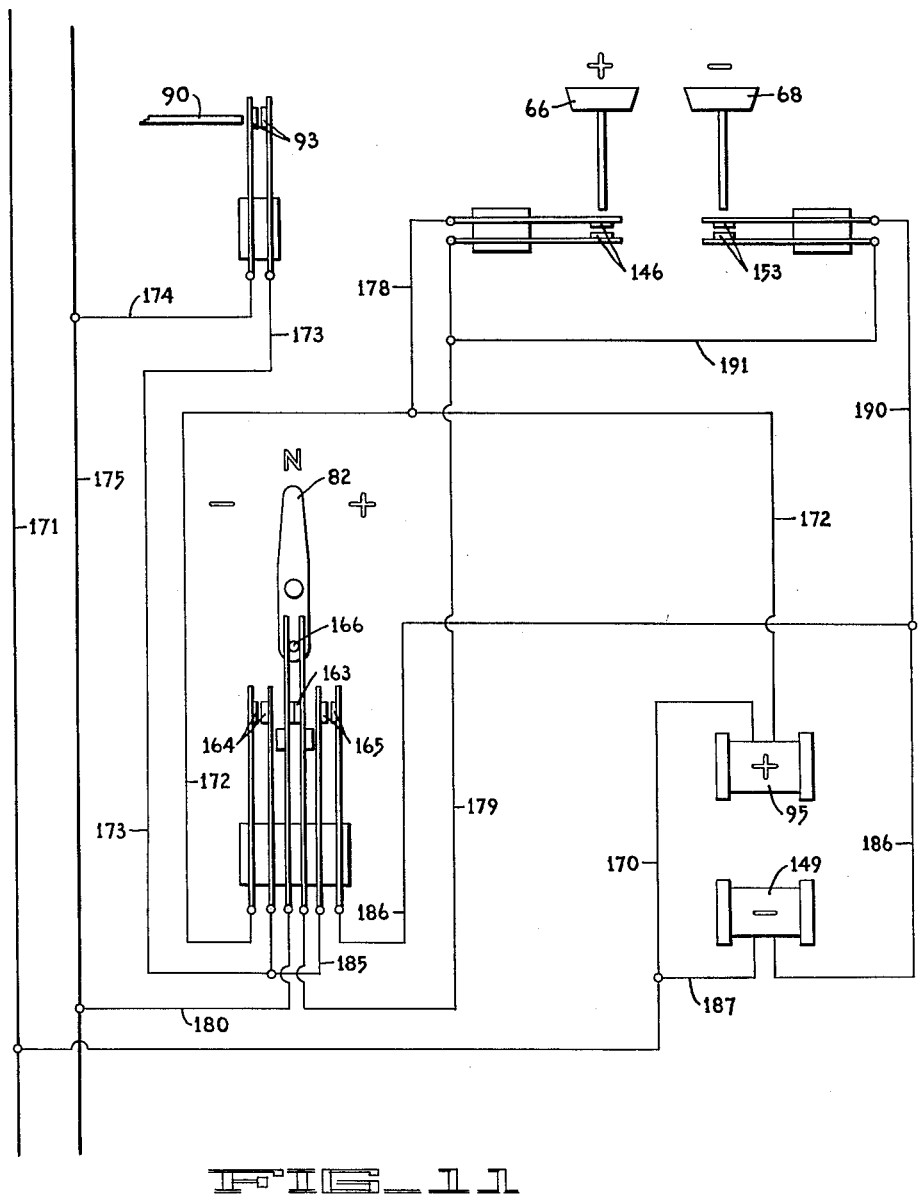
FIG_11
INVENTOR.

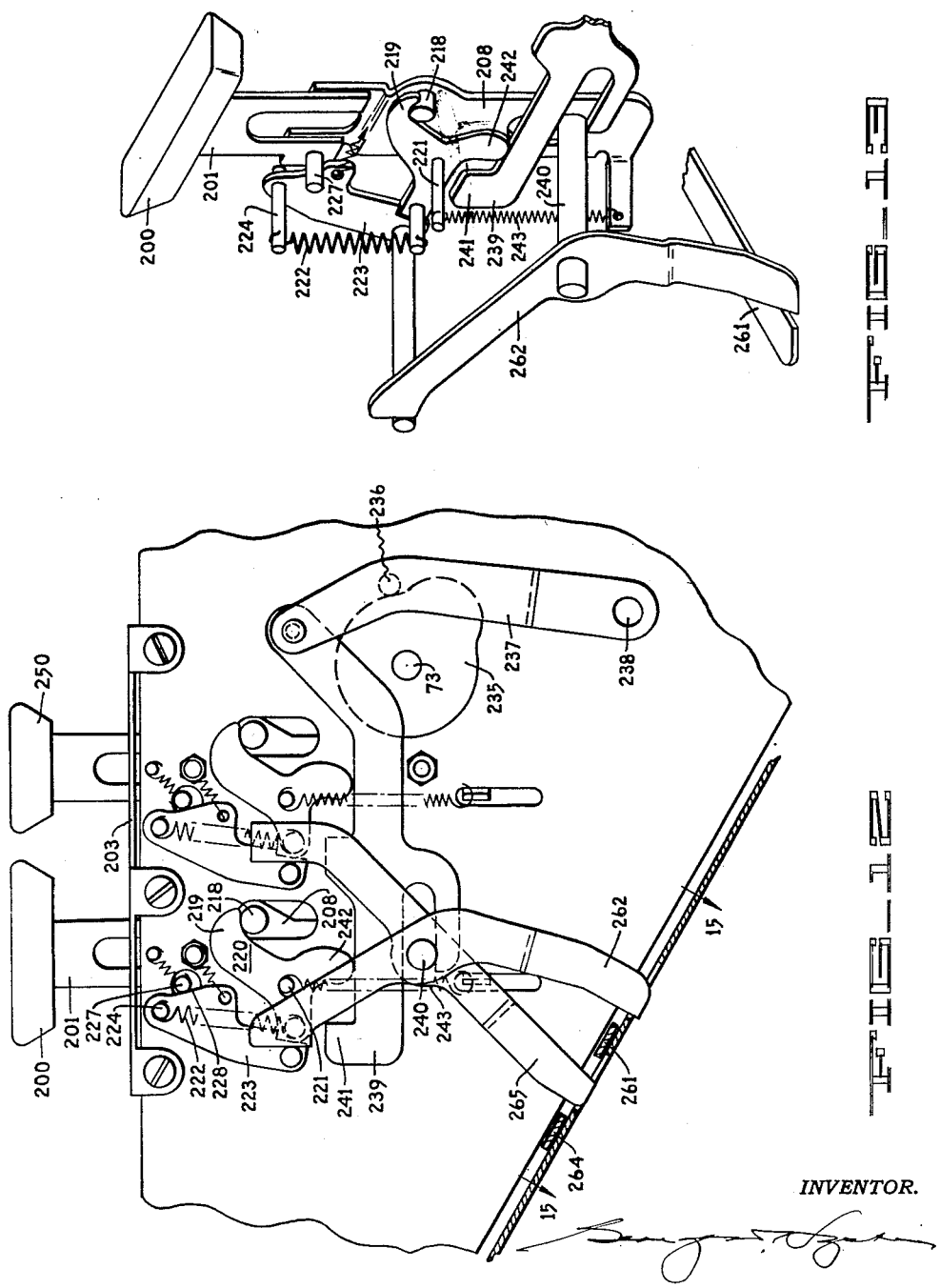

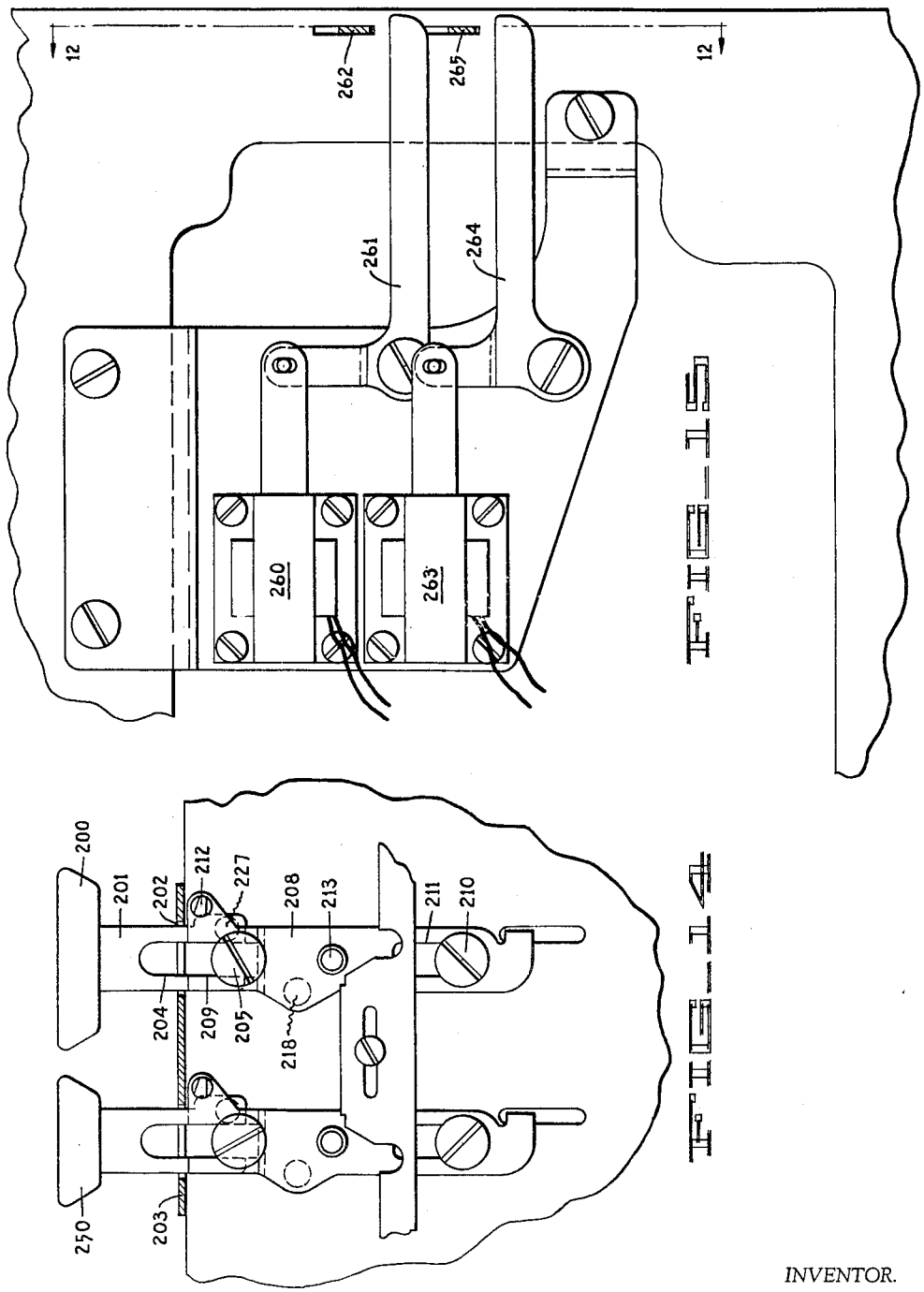

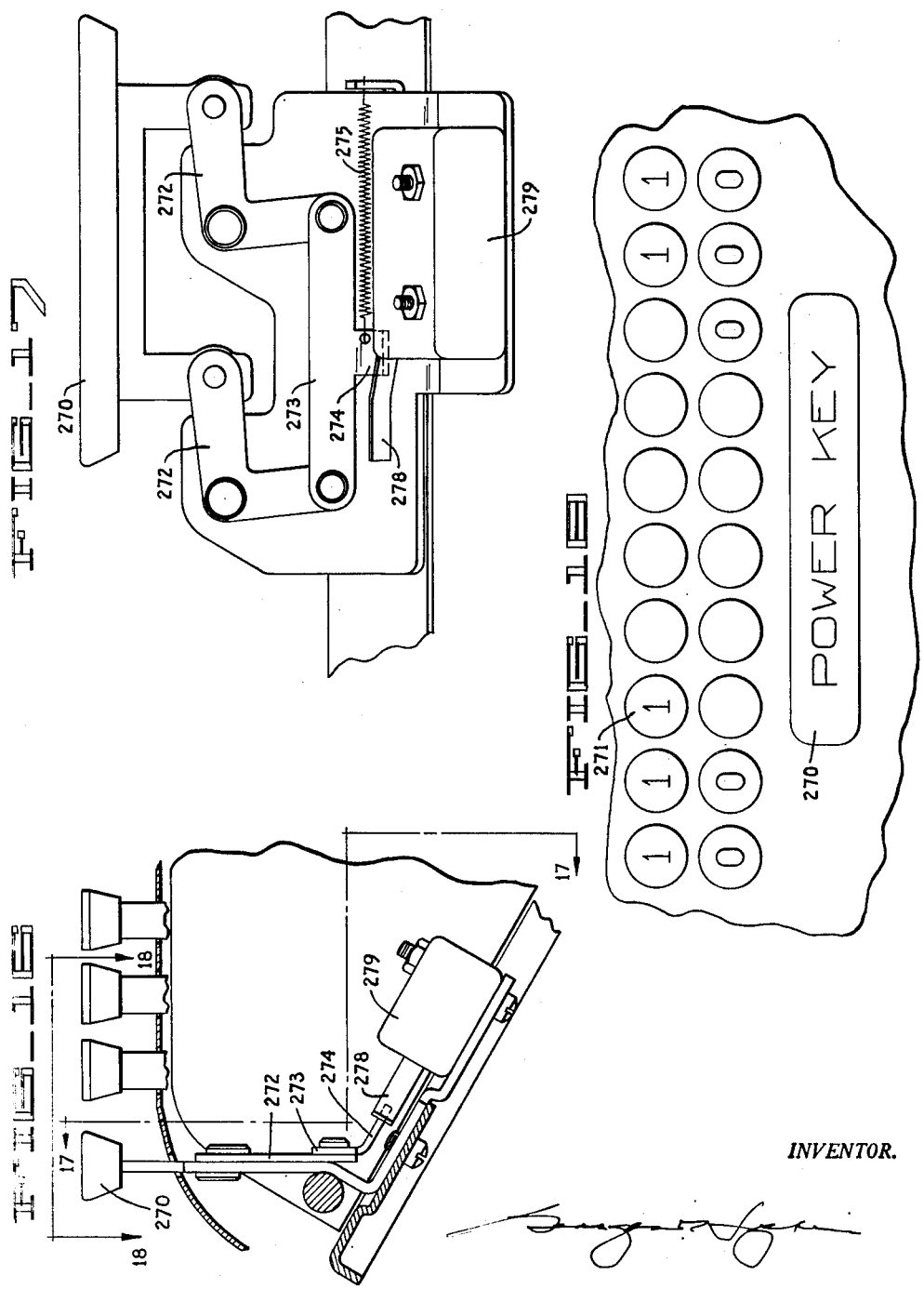

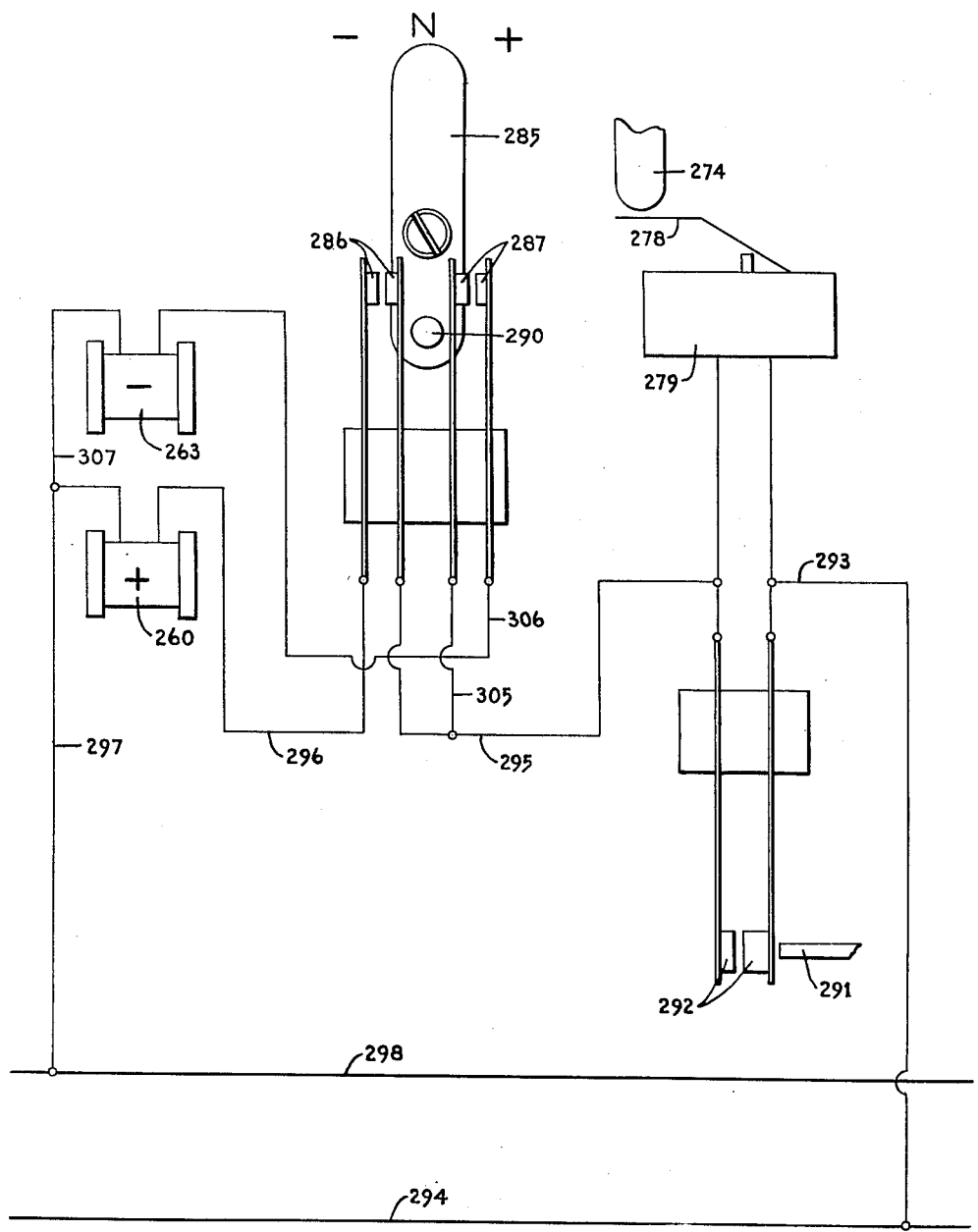
FIG_19

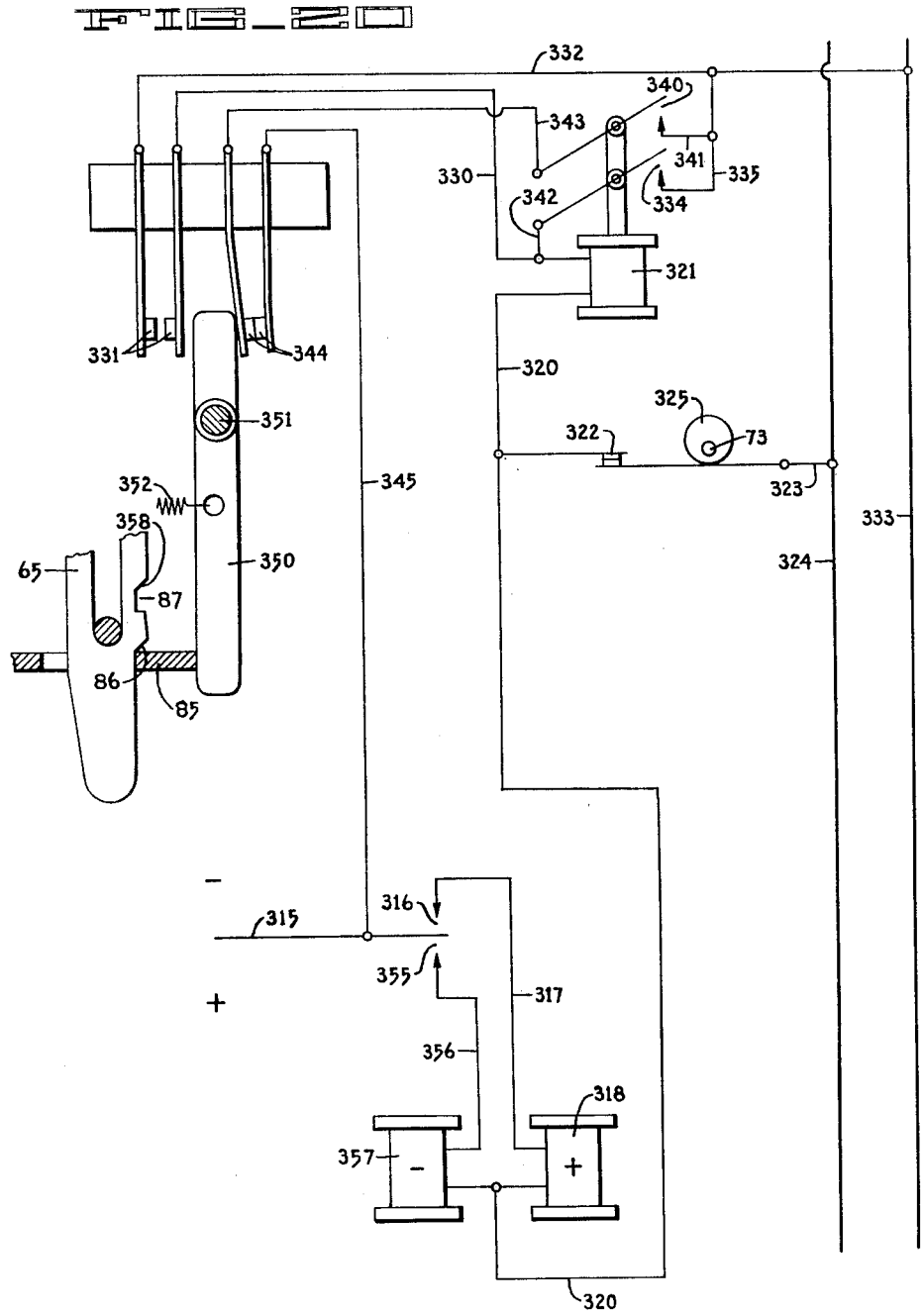

May 15, 1951 G. W. HOPKINS 2,552,789
KEY-RESPONSIVE CYCLE INITIATING MEANS
Filed Sept. 20, 1946 18 Sheets-Sheet 14
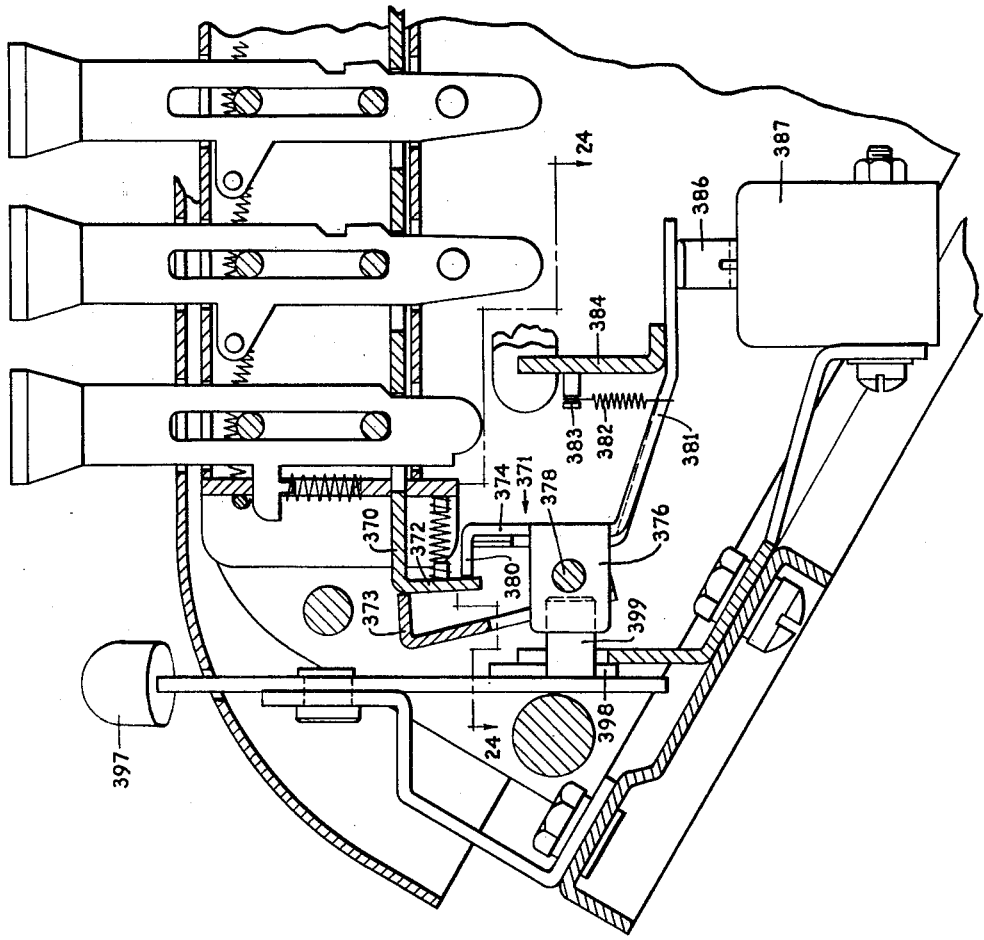
INVENTOR May 15, 1951 G. W. HOPKINS 2,552,789
KEY-RESPONSIVE CYCLE INITIATING MEANS
Filed Sept. 20, 1946 18 Sheets-Sheet 15
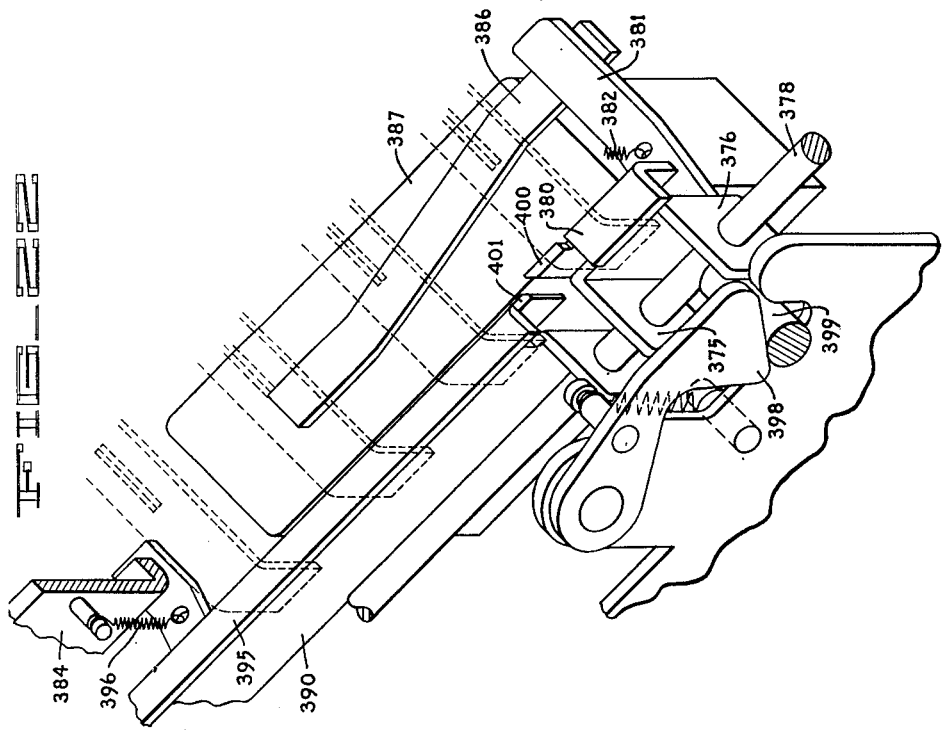
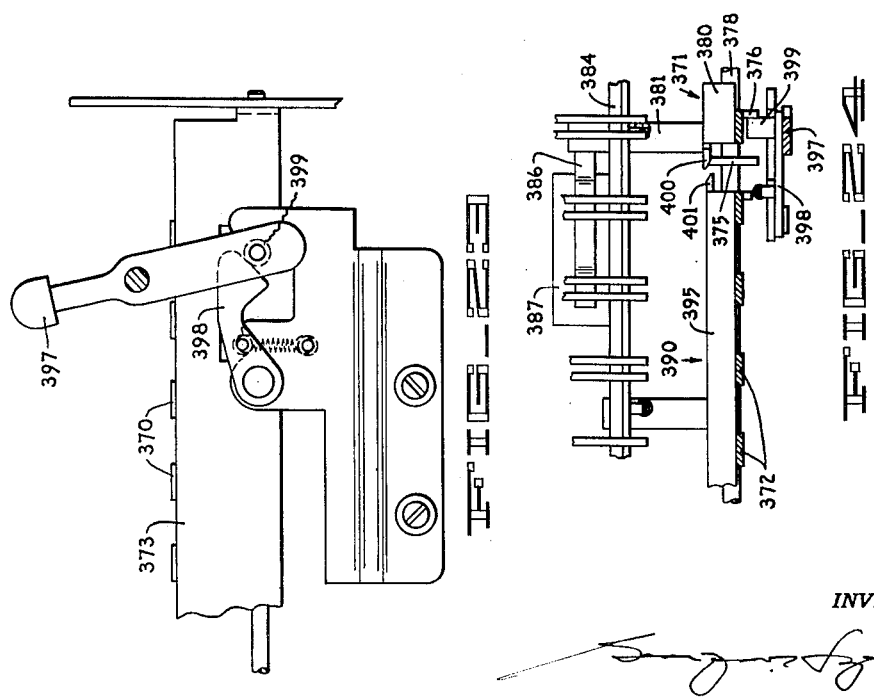
INVENTOR.

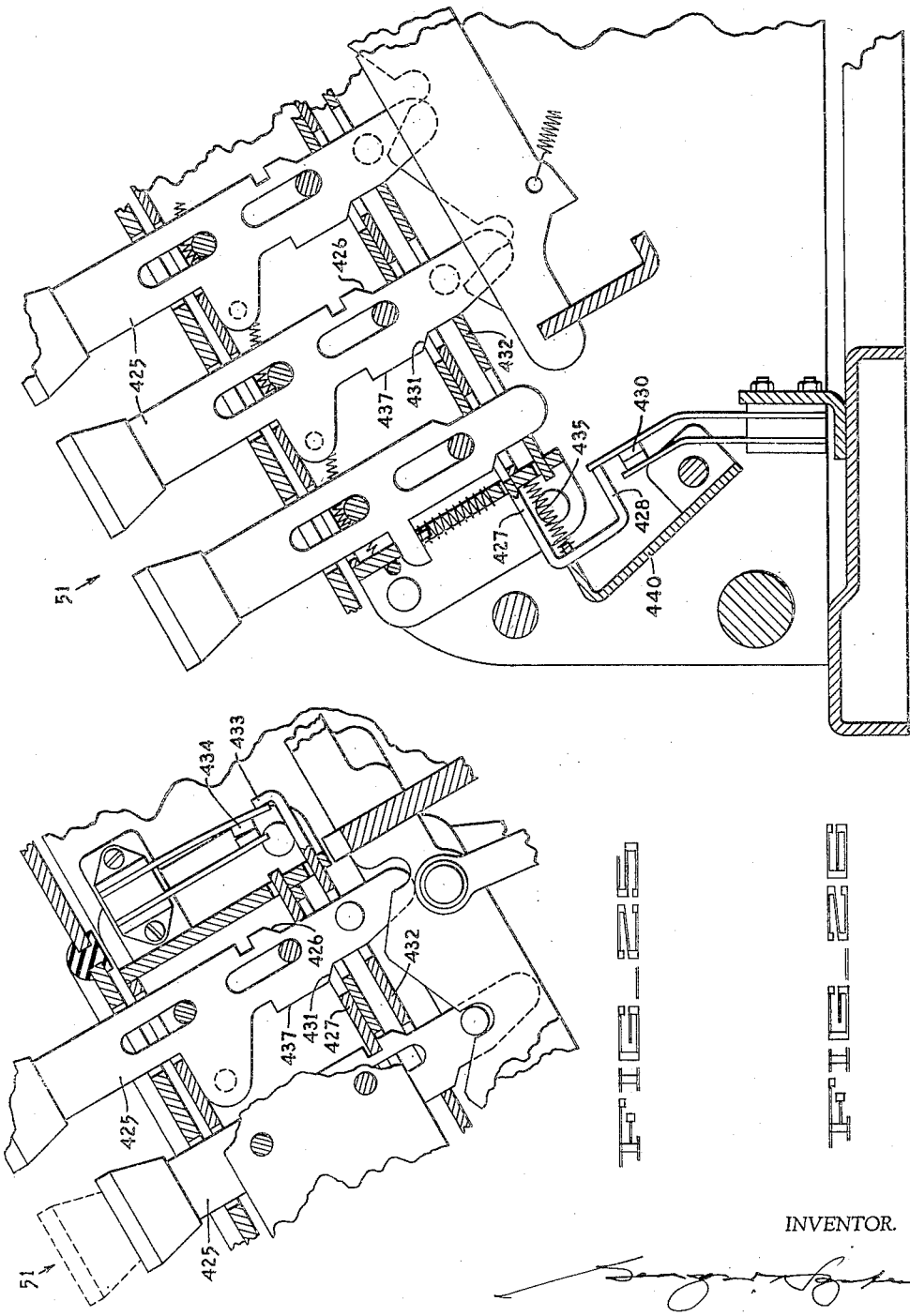

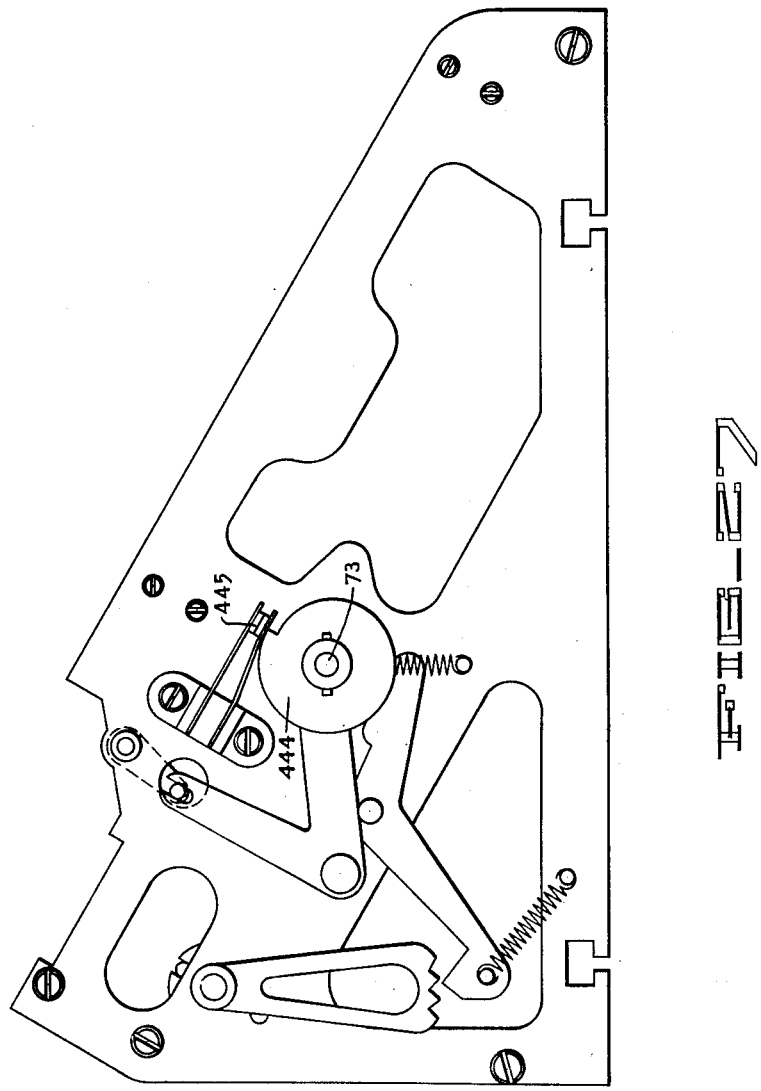

May 15, 1951 G. W. HOPKINS 2,552,789
KEY-RESPONSIVE CYCLE INITIATING MEANS
Filed Sept. 20, 1946 18 Sheets-Sheet 18

INVENTOR.

Patented May 15, 1951

2,552,789

UNITED STATES PATENT OFFICE 2,552,789

KEY-RESPONSIVE CYCLE INITIATING MEANS

George W. Hopkins, San Leandro, Calif., assignor to Friden Calculating Machine Co., Inc., a corporation of California Application September 20, 1946, Serial No. 698,314

28 Claims. (Cl. 235—62)

1

This invention relates to calculating machines, and particularly to machines of the full flexible keyboard type.

The invention will be disclosed as embodied in a machine of the type disclosed in the patent to Friden 2,229,889, issued January 28, 1941. However, it is to be understood that the invention may have broader applications to calculating machines of other types and also to adding machines. In a calculating machine of the type referred to, when performing addition, the item is set up on the keyboard 50 (Fig. 1) which comprises a plurality of ordinally arranged rows 51, 52, 53, 54, 55, 56, 57, 58, 59, 60 and keys 65 bearing the numerals 0 to 9. After the plus bar 66 is depressed it causes the item set on the keyboard 50 to be additively registered in the accumulator 67, if the item is to be subtractively registered, the minus bar 68 is depressed.

An object of this invention is to eliminate the necessity for operating the plus and minus bars 66, 68, in order to facilitate the use of the calculating machine in performing problems of addition and subtraction.

Another object of the invention is to place the mechanism for initiating the registering operation under control of the keyboard in which the value is set so that setting the value therein causes the registering operation to begin.

A further object of the invention is to provide means whereby depression of a key in the units order of the keyboard initiates the registering operation. This means makes it possible for the operator to set the item up on the keyboard beginning with the highest order digit, and upon depression of the units order key, the registering operation is initiated.

Another object of the invention is to provide a means whereby simultaneous depression of a plurality of keys respectively in different orders will, upon release of the last key, cause initiation of the registering operation.

A further object of the invention is to provide means whereby the two previously mentioned modes of operation are provided in the same machine for selective use.

Another object of the invention is to provide means whereby a calculating machine of the type referred to may be selectively converted to a machine in which the registering operation is controlled from the keyboard rather than from the conventional operation control key.

A further object of the invention is to lighten the key touch on the plus and minus keys of a calculating machine.

2

Another object of the invention is to provide means whereby a conventional keyboard may be utilized in carrying out the invention.

Other objects will become evident after a reading of the following disclosure.

In the drawings:

Figures 1 to 11 show a first modification of the invention.

Figure 1 is a plan view of a machine.

Figure 2 is a section taken on the line 2—2 in Figure 1.

Figure 3 is a partial section with parts omitted, taken on the line 3—3 in Figure 1.

Figure 4 is an enlarged detail view.

Figure 5 is a fragmentary section with parts omitted, taken on the line 5—5 in Figure 1.

Figure 6 is an exploded perspective of an operation control key.

Figure 7 is a side elevation of the plus and minus keys.

Figure 8 is an enlarged detail view.

Figure 9 shows the solenoids for operating the plus and minus keys.

Figure 10 is a fragmentary section with parts omitted, showing the selector switch, the view being taken on the line 10—10 in Figure 1.

Figure 11 is a wiring diagram.

Figures 12 to 19 show a second modification of the invention.

Figure 12 shows a mechanical means for spring-loading the plus and minus keys.

Figure 13 is a fragmentary perspective of one of the key mechanisms.

Figure 14 is a side elevation of the plus and minus keys.

Figure 15 shows the solenoids for bringing the plus and minus keys into operation.

Figure 16 is a fragmentary section of the power key.

Figure 17 is a section taken on the line 17—17 in Figure 16.

Figure 18 is a plan view taken on the line 18—18 in Figure 16.

Figure 19 is a wiring diagram.

Figure 20 shows a third modification, and comprises a wiring diagram of electrical means by which a conventional keyboard may be utilized.

Figures 21 to 24 show a fourth embodiment.

Figure 21 is a vertical longitudinal section of the front of the keyboard.

Figure 22 is a perspective view of parts shown in Figure 21.

Figure 23 is a front elevation of the selector lever and mechanisms associated therewith.

Figure 24 is a section taken on the line 24—24 in Figure 21.

Figures 25 to 28 show a fifth modification.

Figure 25 shows means for operating one of the switches.

Figure 26 shows means for operating another of the switches.

Figure 27 shows the cyclic control switch.

Figure 28 is a wiring diagram.

Figure 28:
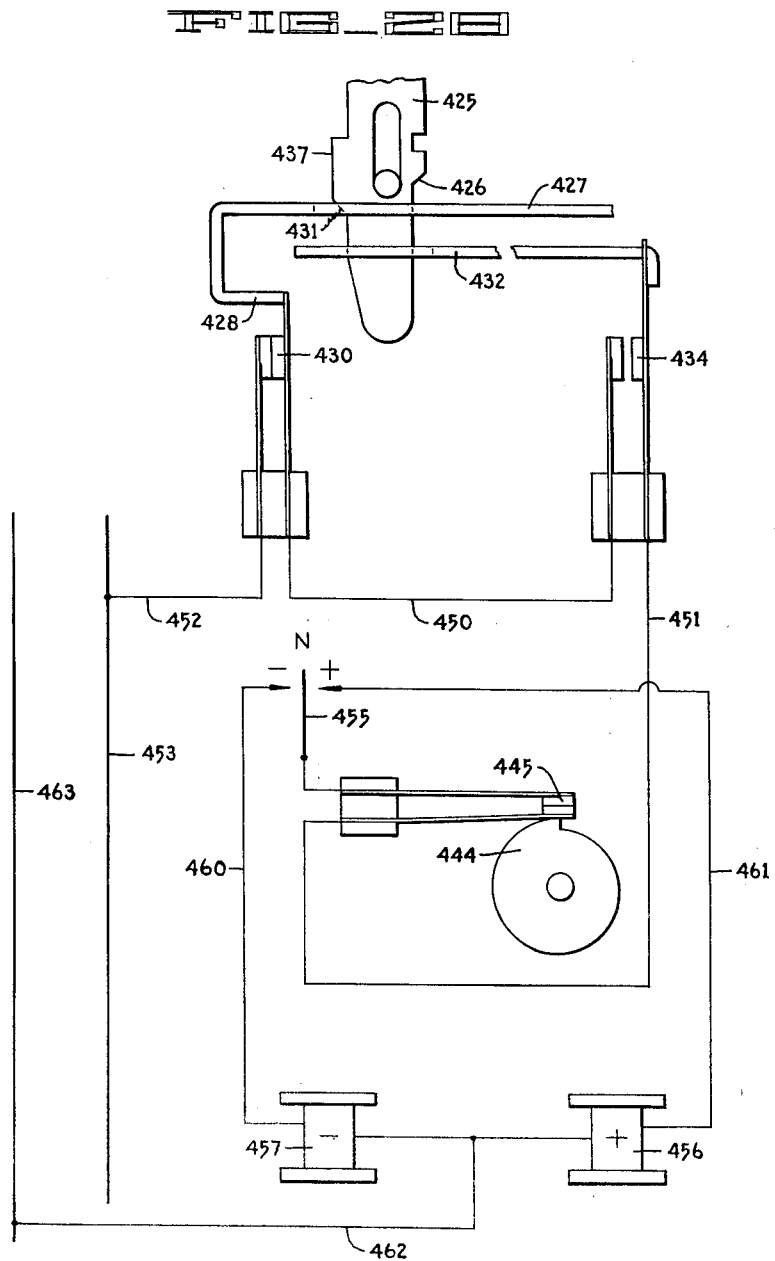

In all other modifications of this invention which are to be described, the use of the mechanism thereof is optional, so that in any event the operator may, if he wishes, operate the machine in the conventional manner.

Referring to Figure 2, the numeral keys 65 may be selectively depressed to differentially position pinions 71 with respect to the teeth on actuator 72. The actuator 72 is driven from a cyclically operable main drive shaft 73 and upon rotation, rotates one of the pinions 71 and the square shaft 74 on which it is mounted a differential amount corresponding to the number of the key 65 depressed. This differential rotation is transmitted to the shaft 77 on which the numeral wheel is mounted, either additively or subtractively, depending upon the adjustment of the reversing gear 78, adjustment of which is determined by a bail or gate 79. Cyclic operation of the drive shaft 73 and positioning of the gate 79 may be controlled by the plus and minus keys 66, 68 (Fig. 1). However, in accordance with the present invention, this is only true when the selector lever 82 is disposed in the "central" or normal operation position. If it is moved to the plus position, depression of the plus key is unnecessary, as will now be described.

In the conventional keyboard each row of keys is provided with a latch slide 85 (Fig. 2) which is cammed rearward by a cam 86 on the key stem, and when the key is fully depressed the latch slide 85 is spring-returned forwardly to enter a notch 87 in the key. The key is shown in latched position in Figure 4. Suitably mounted for sliding movement parallel to the latch slide 85 and disposed beneath the keyboard is a switch operating slide 90. This slide is provided in the present embodiment in the units order 51 only. As shown in detail in Figure 8, depression of the key 65 beyond its latching position causes the cam 86 on the key to move the switch operating slide 90 rearwardly against the tension of its spring 92 (Fig. 2) to close a microswitch 93.

As will presently be explained, closure of the switch 93 causes energization of the solenoid 95 (Fig. 9) which rocks a bellcrank 96. The plus key 66 has a two-part key stem, an upper part 100 and a lower part 101. The lower part 101 has an ear 102 thereon which is engaged by the bellcrank 96. A spring 103 attached to the ear 102 and to a stud in the frame urges the lower part 101 of the key stem upwardly.

The structure of the key stem is shown more clearly in Figures 6 and 7. The upper part 100 is provided with slots 106, 107 for slidable mounting on studs 108, 109 in the frame. The lower key stem 101 has slots 110, 111 for slidable mounting on the same studs. The lower key stem 101 has a stud 112 and a roller 113. As shown in Figure 3, stud 112 is adapted to cooperate with a cam face 115 on the clutch operating slide 116, and the roller 113 is adapted to cooperate with a cam face 119 on the gate operating link 120. The clutch operating slide and the gate operating link are conventional parts of the calculating machine. The link 120 is supported on an arm 123 at its forward end and is pivotally connected to an arm 124 at its rearward end which is secured to the shaft 125 and gate 79 (Fig. 2). Clutch operating slide 116 abuts a pin 128 on the clutch control lever 129 (Fig. 5) which, when rocked clockwise, causes engagement of the cyclic pawl and ratchet clutch 130 of conventional construction. The lever 129 is connected by a link 131 to a lever 132 which operates the switch control lever 133 so that whenever the clutch control lever 129 is moved to clutch engaging position the switch 134 is closed to start the motor.

Thus it will be seen that depression of any key 65 in the units order 51 of the keyboard 50 will move the slide 90 rearwardly to close a switch 93 and energize the solenoid 95 (Fig. 9) to rock the bellcrank 96 which pulls the lower key stem 101 downwardly to cause engagement of the clutch, closure of the motor switch, and movement of the gate to additive position. The lower part of the key stem is latched down by the conventional latch 140 which engages a pin 141 on the key stem, and this latch is released at the end of the cycle by the cam 142. During the type of operation just described, the upper part 100 of the plus bar key stem does not move; instead it is retained in its raised position by a leaf spring 144 (Fig. 9) engaging an ear 145 on the upper part of the key stem. If the operator chooses to utilize the plus bar when the selector lever 82 (Fig. 1) is set in its normal operation position, depression of the upper part 100 of the plus bar key stem through the ear 145 depresses the leaf spring 144 which closes the micro switch 146 which also causes energization of the solenoid 95.

Similar mechanism may be employed to obtain subtractive registration, in which case the selector lever 82 (Fig. 1) is moved to minus position, which causes closure of the switch 93 to energize the solenoid 149 (Fig. 9) which, through a bellcrank 150, draws down the lower part 101 of the minus bar key stem. Similarly, if the operator chooses to depress the minus bar 68, when the selector lever 82 (Fig. 1) is set in its normal operation position, the upper part of its key stem, through its ear 151, depresses the leaf spring 152 of a microswitch 153 which also causes energization of the solenoid 149. As can be seen in Figure 3, when the lower part 101 of the minus bar key stem is depressed its pin 112 moves the clutch control slide 116 in the same manner as the plus bar, and its roller 113 engages a reverse cam 156 which moves the gate operating link 120 forwardly to adjust the gate to the subtract position.

The structure of the selector switch will now be described by reference to Figure 10. The lever 82 is provided with a detent 160 which holds it in any one of its three adjusted positions. As shown in Figure 10, it is in the central or normal operation position when the switch 163 is normally closed, and the switches 164, 165 are normally open. If the lever 82 is moved forwardly to the add position a pin 166 thereon opens the switch 163 which in turn closes the switch 164 and similarly, if the selector lever 82 is moved rearward to the subtract position, the pin 166 opens the switch 163 which in turn closes the switch 165.

Referring now to the wiring diagram shown in Figure 11. The plus solenoid 95 is connected by a line 170 to one side 171 of the power supply. The solenoid 95 is also connected by a line 172 to one side of the switch 164, the other side of which is connected by a line 173 to one side of the switch 93, the other side of which is connected by a line 174 to the other side of the power supply 175.

Accordingly, with the lever 82 set in the plus position where the switch 164 is closed, depression of a key in the units order will move the slide 90 to close the switch 93 thereby completing the circuit to the solenoid 95 which, as explained, causes energization of an additive registration. When the selector lever 82 is in its normal position where the switch 163 is closed, the solenoid 95 may be energized by depression of the plus bar 66 by reason of the fact that the line 172 has connected thereto a line 178 which is connected to one side of the switch 146, the other side of which is connected by a line 179 to one side of the switch 163, the other side of which is connected by a line 180 to the power supply line 175.

When the selector lever 82 is in the minus position where the switch 165 is closed, closure of the switch 93 will cause energization of the solenoid 149 by reason of the fact that the line 173 is connected by a line 185 to one side of the switch 165, the other side of which is connected by a line 186 to the solenoid 149. The solenoid is also connected by a line 187 to the line 170. With the selector lever 82 in the minus position, depression of any key in the units order will cause energization of the solenoid 149. If the selector lever 82 is in the normal position the solenoid 149 may be energized by means of the minus key 68 by reason of the fact that the switch 153, which is closed when the key is depressed, has one side connected by a line 190 to the line 186, the other side of the switch 153 is connected by a line 191 to the line 179.

In the operations previously described, the automatic keyboard clear key 192 (Fig. 1) is presumably set in its operative position so that in adding a column of figures the operator sets the number up from left to right, and when a key in the units order is depressed, the machine cycles and by well-known mechanism disclosed in the previously mentioned patent, the keyboard is automatically cleared at the end of the first cycle so that the operator may then proceed to enter the second item and so on. However, the mechanism of this invention may be utilized for repeat operations such as multiplication by releasing the key 192 so that the keyboard will not be cleared at the end of the cycle, in which case all of the keys remain in their latched position. To repeat the entry it is only necessary for the operator to again touch the depressed units order key. In so doing, he moves the key from the latched position shown in Figure 4 to the position shown in Figure 8 where the cam 86 will again move the slide 90 to close the switch 93. Repeated entries can be made in this manner with great rapidity, using a staccato touch on the key and counting the number of times the key is touched. In multiplication, the shift key 193 which is adjacent the units order 51 is conveniently operated to move the carriage over readily for repeating the entry of the item in the next order. If the problem were to multiply 369875 by 125 the operator would release the automatic keyboard clear key 192, set the multiplicand on the keyboard and repeat the entry by depressing the units order 5 key four times after the first entry, he would then touch the sift key 193 and touch the units order 5 key twice, finally, he would touch the shift key 193 and touch the units order 5 key once.

The second embodiment shown in Figures 12 to 19 differs from the first embodiment in that the work of the key moving the lower parts of the plus and minus key stems is done mechanically rather than electrically, and this, as will presently appear, permits the use of solenoids of greatly reduced size. Referring to Figure 14, plus bar 200 has an upper key stem 201 which is guided in a slot 202 in the cover 203, and by means of a slot 204 on a stud 205 secured to the frame. The lower key stem 208 is guided on the stud 205 by a slot 209 and on a stud 210 by means of a slot 211. The lower part of the key stem is provided with a pin 212 and a roller 213 which correspond to the pin 112 and roller 113 in Figure 3 and perform the same functions, i. e., upon downward movement of the lower key stem 208 the pin 212 causes movement of mechanism which engages the clutch and closes the motor switch, and the roller 213 moves mechanism which urges the gate to additive position. The lower key stem 208 (Fig. 12) has a pin 218 thereon engaged by the nose 219 of a lever 220 pivoted on the frame at 221. The lever 220 is urged clockwise by a strong tension spring 222 but is normally restrained in the position shown by a latch 223 pivoted at 224 to the frame. The upper key stem 201 has a pin 227 thereon which engages a cam face 228 on the latch 223. Whenever the operator touches the plus bar 200, the upper key stem 201 moves downwardly a short distance and the pin 227 rocks the latch 223 clockwise to release the lever 220, which, under the influence of its spring 222, rocks clockwise, drawing the lower key stem 208 downwardly and causing it to initiate an additive registration.

A cam 235 on the main drive shaft 73 engages a pin 236 on a lever 237 pivotally mounted on the frame at 238 and rocks the lever clockwise to draw a link 239, supported on a stud 240, rearwardly. A lug 241 on the link 239 engages the foot 242 of the lever 220 and restores it to latching position. The lower key stem 208 is restored to the position shown by a light spring 243. As can be seen, the mechanism associated with the minus key 250 is substantially identical with that provided for the plus key, and a detailed description thereof is therefore deemed unnecessary. The above described mechanism provides a light key touch for the plus and minus keys at all times.

When the machine is utilized, as previously described, to cause initiation of the registering operation by depression of a key in the units order, the solenoids merely trip the latches 223. This is effected as follows. If the selector lever is set for additive operation, depression of a key in the units order will cause energization of solenoid 260 (Fig. 15) which rocks bellcrank 261 which in turn rocks lever 262 (Fig. 12) pivoted on the stud 240. This causes the lever 220 to be unlatched and to operate as previously described. If the selector lever is set for subtractive operation the solenoid 263 (Fig. 15) is energized, and this rocks bellcrank 264 which rocks the lever 265 to trip the latch of the minus bar key stem.

In order to facilitate setting up numbers which terminate in a plurality of ciphers, a key 270 (Figs. 16 to 18) is provided at the front of the keyboard. Depression of this key will cause initiation of the registering operation so that, for example, if the number to be entered were 10,000,000 the operator would depress the key 271 in the keyboard and then touch the bar 270 with his thumb. As shown in Figure 17, the bar 270 is mounted on a pair of bellcranks 272 which are inter-connected by a link 273 having a lug 274 to which the return spring 275 is attached. Upon depression of the bar 270 the lug 274 engages the lever 278 of a microswitch 279, closing the switch.

Referring now to the wiring diagram shown in Figure 19. The selector lever 285 is shown in the normal operation position in which switches 286 and 287 are normally open. When so conditioned the calculating machine operates in its usual manner, except that as previously described, the touch on the plus and minus keys is light. If the selector lever 285 is moved to the add position the switch 286 is closed by the pin 290 with the parts so conditioned that depression of a key in the units order moves the slide 291 to close the switch 292. One side of this switch is connected by a line 293 to one side 294 of the power line, the other side of the switch is connected by a line 295 to one side of the switch 286, the other side of which is connected by a line 296 to the solenoid 260, the other side of which is connected by a line 297 to the other side of the power line 298. Thus, it will be seen that adjusting the lever 285 to the add position closes the switch 286 which is in series with the switch 292 so that depression of a key in the units order will complete a circuit through the solenoid 260 which, as previously described, initiates an additive registration.

With the parts so adjusted, depression of the key 270 will, as previously described, cause the lug 274 to depress the lever 278 of the microswitch 279. Closure of the switch 279 will then complete a circuit through the solenoid 260.

When the selector lever 285 is set in the minus position the pin 290 closes the switch 287, one side of which is connected by a line 305 to the line 295, the other side of which is connected by a line 306 to the solenoid 263, the other side of which is connected by a line 307 to the line 297. With the parts so conditioned, closure of the switch 292 will complete a circuit through the solenoid 263 to cause energization of a subtractive operation. As previously described, depression of the key 270 with the lever 285 in the minus position will cause minus registration.

The third modification will now be described. By referring to Figure 2 it will be recalled that in the two previous modifications a special slide 90 (Fig. 2) was placed below the keyboard for operating the switch 93. In the present modification this slide is eliminated and the regular key latch slide 85 is utilized, as will now be explained. As is well-known, this latch slide 85 is urged forwardly by a spring (not shown). When a key 65 in the units order is depressed its cam 86 moves the latch slide 85 rearwardly, and when the key is depressed further the latch slide 85 moves forwardly to enter the notch 87. Now, let us assume that the selector lever 315 (Figure 20) is in the plus position where the switch 316 is closed. The switch 316 is connected by a lead line 317 to the solenoid 318 which would correspond to the solenoid 95 in the first modification, or the solenoid 260 in the second modification. Solenoid 318 is connected by a line 320 to the relay 321. One side of a normally closed switch 322 is connected to the line 320, the other side of the switch being connected by a line 323 to one side 324 of the power supply. Switch 322 is adapted to be opened by a cam 325 on the main drive shaft 73 when the machine cycles. The relay is connected by a line 330 to one side of a normally open switch 331, the other side of which is connected by a line 332 to the other side of the power supply 333. Relay switch 334 is connected by a line 335 to line 332. Relay-operated switch 340 is connected by a line 341 to line 335. The other side of the switch 334 is connected by a line 342 to line 330. The other side of switch 340 is connected by a line 343 to one side of switch 344, the other side of which is connected by a line 345 to switch 316.

Lever 350 pivoted at 351 is urged counter-clockwise by a spring 352 and engages an end of latch slide 85 and holds switch 344 normally closed. When a key 65 in the units order is depressed the latch slide 85 rocks the lever 350 counter-clockwise to close switch 331 and to permit switch 344 to open. Closure of switch 331 causes energization of relay 321 by completing a circuit through the following elements, power supply line 333, line 332, switch 331, line 330, relay 321, line 320, switch 322, line 323, and power supply line 324. As soon as the relay is energized, switch 334 is closed. This locks the relay in by completing a circuit which shunts the switch 331. This circuit comprises line 332, line 335, switch 334, line 342, line 330, relay 321, line 320, switch 322 and line 323.

Relay-operated switch 340 is now held closed as long as the relay is energized. This switch is in series with switch 344 which is held open until the key 65 has been fully depressed far enough to enable the slide 85 to return to latching position, enabling the lever 350 to rock clockwise to close the switch 344 thereby completing a circuit to the solenoid 318 as follows, line 332, line 335, line 341, switch 340, line 343, switch 344, line 345, switch 316, line 317, solenoid 318, line 320, switch 322 and line 323. Therefore, as soon as the key has been depressed and latched the machine will cycle. When the machine cycles the cam 325 opens the switch 322 de-energizing the relay 321. When the keyboard is automatically cleared the latch slide 85 is moved rearwardly to release the key. This will rock the lever 350 but the relay 321 will not be energized because the cam 325 is holding the switch 322 open until full cycle position. Subtractive operation is obtained by moving the lever 315 to the minus position to close the switch 355 which is connected by line 356 with solenoid 357 which is connected to line 320.

As thus described, automatic operation of the machine from depression of a key in the units order is obtainable without the alteration of the standard keyboard by utilizing the movement of the latch slide. If it is desired to obtain the repeat operation feature described in connection with the first modification, it is only necessary to provide an additional cam face 358 on the numeral key 65 in the units order, so that further depression of any key beyond its latched position will move the slide 85 rearwardly, and upon release of the key the latch slide will move back into the notch 87 and the machine will cycle.

The fourth modification consists in providing a full "live" keyboard which permits the operator to simultaneously depress a plurality of keys, and upon release of the keys have the item registered. This type of operation is similar to that obtained in key drive machines, except that the regular power driven calculator mechanism is still employed to perform the registering operation. This is effected by utilizing the method described in connection with the third modification shown in Figure 20. That is, it can be effected by utilizing a standard keyboard. As shown in Figure 21, the conventional key latching slide 370 in the units order has a bail 371 disposed beneath its front end, the latch slide has the usual downwardly projecting end 372 for cooperation with the conventional keyboard clearing bail 373. The bail 371 is constructed as follows. It comprises a central vertically extending portion 374 from which two ears 375, 376 (Fig. 22) extend forwardly, and are provided with apertures for pivotal and sliding movement on a fixed rod 378.

Integral with the central portion 374 and disposed at its upper edge is a flanged portion 380 which engages the rear face of the downwardly extending portion 372 of the latch slide 370. Integral with the bail 371 is a rearwardly extending arm 381 which has a spring 382 attached thereto, and to a pin 383 in a portion of the frame 384. The spring 382 serves to urge the bail counter-clockwise on the rod 378. The end of the arm 381 overlies the leaf 386 of a microswitch 387. This switch contains two normally open and two normally closed contacts which correspond to the switches 331 and 344 in Figure 20. In accordance with the present modification, the operator may optionally have units order control, as just described, or full keyboard control, as will now be explained.

Pivoted on the rod 378 is a second bail 390 (Figs. 22 and 24). This bail is similar to the short bail 371 but cooperates with all orders of the keyboard, except the units order. It has a flange 395 similar to the flange 380 which is disposed behind the depending portions 372 of all the other latch slides. This bail is also urged counter-clockwise by a spring 396.

To obtain full keyboard control the lever 397 is rotated clockwise from the position shown in Figure 23, where it is resiliently held by a detent 398 that cooperates with a stud 399 in the lever 397. The stud 399 picks up the ear 375 and moves the bail 371 to the left in Figure 24 so that an ear 400 on the bail 371 overlaps an ear 401 on the bail 390. The two bails are now interlocked for a con-joint action. Upon depression of the first of a plurality of keys which are depressed simultaneously, the latch slide 370 of that key will move rearwardly, and its depending portion 372 will engage either the flange 380 of the short bail 371 or the flange 395 of the long bail 390, and rock the bail 371 clockwise. As previously described, to close the switch 331 (Fig. 20) would open the switch 344. It will be recalled that this causes energization of the relay 321 which is then automatically locked in. The circuit, including the solenoid 318 is now conditioned for operation whenever the switch 344 closes. This can only occur when the bail 371 is free to return to its original position and because of the fact that the bail 371 is joined to the bail 390, the bail 371 cannot return as long as any key in the keyboard is partially depressed. When no key in the keyboard is partially depressed, or in other words, when all of a plurality of keys which were depressed are latched, then all of the latch slides 370 have returned to their forward position and then, and only then, can the bail 371 return to permit the switch 344 to close. The operation from this point is the same as that previously described in connection with Figure 20.

The fifth embodiment disclosed in Figures 25 to 28 contemplates using two switches in series, one operated by the regular key latch slide and the other by an auxiliary slide.

The keys 425 in the units order 51 (Figs. 25 and 26) have the usual cam 426 which moves the latch slide 427 rearwardly. The front end of the slide 427 has an ear 428 which opens a normally closed switch 430 when the slide 427 is moved rearwardly by depression of any key 425. When the key has been partially depressed, a cam 431 moves an auxiliary slide 432 forwardly, and an ear 433 on the rear end of the slide 432 closes a normally open switch 434. When the key is fully depressed the latch slide 427 returns forwardly under the influence of its spring 435 and the switch 430 closes. The key is now latched down and a portion of the key stem 437 holds the auxiliary slide 432 forwardly, maintaining the switch 434 closed. Thus, there is only one condition in which both switches are closed, i. e., with the key latched down. When the key is released, and this is effected automatically, utilizing the automatic keyboard control key 192 (Fig. 1), the clear bail 440 moves the slide 427 rearwardly thereby opening the switch 430 and releasing the depressed key 425. As the key rises, slide 432 moves rearwardly, opening the switch 434 and when the key reaches its fully raised position the slide 427 moves forwardly, thereby permitting the switch 430 to close. However, the machine cannot be operated until another key in the units order has been depressed, as previously described. As a safeguard against causing a repeat cycle, when the keyboard is cleared a cam 444 (Fig. 27) is secured to the left end of the main drive shaft 73. In the full cycle position of the shaft 73 shown, the cam holds a normally open switch 445 closed. As soon as the machine cycles, this switch opens and is not again closed until the end of the cycle.

Referring now to the wiring diagram in Figure 28. As there shown, the normally closed switch 430 is connected in series with the normally open switch 434 by a line 450. Switch 434 is connected in series with the switch 445 by a line 451. Switch 430 is connected by a line 452 to supply line 453. The switch 445 is connected to a double-throw switch 455 by means of which either the plus bar control solenoid 456, or the minus bar control solenoid 457 may be connected into the circuit. One side of the switch 455 is connected by a line 460 to the solenoid 457, and the other side is connected by a line 461 to the solenoid 456. Both solenoids are connected by a line 462 to supply line 463. After the selector switch 455 has been set for the desired sign operation, depression of any key 425 in the units order will first, by means of its cam 426, move slide 427 to the right and open the switch 430. Further depression of the key will, through its cam 431, move the slide 432 to the left, closing the switch 434. Upon complete depression of the key, movement of the slide 427 to the left permits the switch 430 to close. The three switches 430, 434 and 445 are now all closed and the circuit to the solenoid is completed. The solenoid serves, as previously described, to initiate the registering cycle. In the early part of the cycle, the cam 444 permits the switch 445 to open so that another cycle cannot be initiated until the current cycle is completed. However, before the conclusion of the current cycle, the key is automatically unlatched by moving the latch slide 427 to the right, opening the switch 430, and when the key rises, the switch 434 opens so that at the end of the cycle parts re-assume the position shown in Figure 28.

I claim:

1. In a calculating machine, a register, registration control means including a plural order keyboard, an adjustable registration sign control, cyclically operable actuating means, a motor, means including a clutch for controlling the transmission of power from said motor to said actuating means, means for adjusting said sign control, means for engaging said clutch, a first member for operating said clutch-engaging means and said sign control adjusting means for additive registration, a second member for operating said clutch engaging means and said sign control adjusting means for negative registration, spring-urged elements for respectively actuating said members, latches for respectively restraining said spring-urged elements, and plus and minus keys operable to release said latches respectively.

2. In a calculating machine, a register, registration control means including a plural order keyboard, cyclically operable actuating means, a motor, means including a clutch for controlling transmission of power from said motor to said actuating means, means for engaging said clutch, a two-part operation control key, the upper part of said key being adapted to be manually operated, the lower part of said key being adapted to operate said clutch-engaging means, spring-urged means for actuating said lower part of said key, a latch for restraining said spring-urged means, said latch being released by said upper part of said key.

3. In a calculating machine, a register, registration control means including a plural order keyboard, and cyclically operable actuating means, a motor, means including a clutch for controlling transmission of power from said motor to said actuating means, means for engaging said clutch, spring-urged means for actuating said clutch-engaging means, a latch for restraining said spring-urged means, means including a solenoid for releasing said latch, a switch controlling energization of said solenoid, and means actuated by depression of a key in the units order of said keyboard for closing said switch.

4. In a calculating machine, a register, registration control means including a plural order keyboard, and cyclically operable actuating means, a motor, means including a clutch for controlling transmission of power from said motor to said actuating means, means for engaging said clutch, spring-urged means for actuating said clutch-engaging means, a latch for restraining said spring-urged means, means including a solenoid for releasing said latch, a switch controlling energization of said solenoid, means actuated by depression of a key in the units order of said keyboard for closing said switch, and a manually settable switch means in the circuit of said solenoid for determining whether or not depression of a key in the units order of said keyboard will cause energization of said solenoid.

5. In a calculating machine, a register, registration control means including a plural order keyboard, cyclically operable actuating means, a motor, means including a clutch for controlling transmission of power from said motor to said actuating means, means for engaging said clutch, a two-part operation control key, the upper part of said key being adapted to be manually operated, the lower part of said key being adapted to operate said clutch-engaging means, spring-urged means for actuating said lower part of said key, a latch for restraining said spring-urged means, said latch being released by said upper part of said key, means including a solenoid for releasing said latch, a switch controlling energization of said solenoid, and means actuated by depression of a key in the units order of said keyboard for closing said switch.

6. In a calculating machine, a register, registration control means including a plural order keyboard, an adjustable registration sign control, cyclically operable actuating means, a motor, means including a clutch for controlling the transmission of power from said motor to said actuating means, means for adjusting said sign control, means for engaging said clutch, plus and minus keys, said plus key being constructed in two parts, the upper part of said key being adapted to be manually operated, the lower part of said key being adapted to operate said clutch-engaging means and said sign control adjusting means for additive registration, said minus key being constructed in two parts, the upper part of said key being adapted to be manually operated, the lower part of said key being adapted to operate said clutch-engaging means and said sign control adjusting means for negative registration, spring-urged means for actuating said lower part of each of said keys, a latch for restraining each of said spring-urged means, each latch being adapted to be released by the upper part of the key, means including a solenoid for releasing each of said latches, a switch controlling energization of said solenoids, means actuated by depression of a key in the units order of said keyboard for closing said switch, and a manually settable switch means controlling the circuits of said solenoids for determining whether either or neither of said solenoids will be energized upon depression of a key in the units order of said keyboard.

7. In a calculating machine, a register, registration control means including a plural order keyboard, an adjustable registration sign control, and cyclically operable actuating means, a motor, means including a clutch for controlling transmission of power from said motor to said actuating means, solenoid means for causing adjustment of said sign control to condition the machine to enter a value with a selected sign character and for causing engagement of said clutch, a latch in the units order of said keyboard adapted to be moved upon depression of any key in the units order and serving to latch down the key depressed, switch means responsive to movement of said latch for causing energization of said solenoid upon latching of said key by said latch, settable means positionable in either of two set positions for determining the sign character selected by adjustment of said sign control when said switch means is operated by movement of said latch effected by depression of said units order key, and means for releasably maintaining said settable means in either of its set positions.

8. In a calculating machine, a register, registration control means including a plural order keyboard and cyclically operable actuating means, a motor, means including a clutch for controlling transmission of power from said motor to said actuating means, means for causing engagement of said clutch including a solenoid, a latch in the units order of said keyboard adapted to be moved upon depression of any key in the units order and serving to latch down the key depressed, a source of electrical power, a relay, a switch for completing a circuit from said source of power to said relay, means operated by said latch upon depression of a key in said units order for closing said switch, said relay when energized serving to close a second switch in the circuit of said solenoid, and a third switch in series with said second switch, said third switch being closed by said latch-operated means upon movement of said latch to latching position.

9. In a calculating machine, a register, registration control means including a plural order keyboard and cyclically operable actuating means, a motor, means including a clutch for controlling transmission of power from said motor to said actuating means, means for causing engagement of said clutch including a solenoid, a latch in the units order of said keyboard adapted to be moved upon depression of any key in the units order and serving to latch down the key depressed, a source of electrical power, a relay, a switch for completing a circuit from said source of power to said relay, means operated by said latch upon depression of a key in said units order for closing said switch, said relay when energized serving to close a second switch in the circuit of said solenoid, a third switch in series with said second switch, said third switch being closed by said latch-operated means upon movement of said latch to latching position, a normally closed switch in the circuit of said relay, and means operated by said actuating means for opening said last-named switch.

10. In a calculating machine, a register, registration control means including a plural order keyboard and cyclically operable actuating means, a motor, means including a clutch for controlling transmission of power from said motor to said actuating means, means for causing engagement of said clutch including a solenoid, a member in each order of said keyboard adapted to be displaced from normal position upon depression of a key in the associated order and returned to said position when the key has been completely depressed, means common to all said members having a first movement imparted thereto by displacement of any of said members from its normal position and having a second movement imparted thereto following said first movement when all said members are disposed in their normal positions, and means responsive to movement of said common means for causing energization of said solenoid when said second movement occurs.

11. In a calculating machine, a register, registration control means including a plural order keyboard and cyclically operable actuating means, a motor, means including a clutch for controlling transmission of power from said motor to said actuating means, means for causing engagement of said clutch including a solenoid, a latch in each order of said keyboard adapted to be displaced from normal position upon depression of a key in the associated order and returned to said position to latch down the key depressed, means common to all said latches having a first movement imparted thereto by displacement of any of said latches from its normal position and having a second movement imparted thereto following said first movement when all displaced latches have returned to their normal positions, and means responsive to movement of said common means for causing energization of said solenoid when said second movement occurs.

12. In a calculating machine, a register, registration control means including a plural order keyboard and cyclically operable actuating means, a motor, means including a clutch for controlling transmission of power from said motor to said actuating means, means for causing engagement of said clutch including a solenoid, a latch in each order of said keyboard adapted to be displaced from normal position upon depression of a key in the associated order and returned to said position to latch down the key depressed, a two part sensing device comprising a first part cooperating with the units order latch for sensing when a key in the units order has been depressed and latched down, a second part cooperating with the latches in all orders other than the units order for sensing when a key in said other orders has been depressed and when all latches in said other orders are in their normal positions, means for selectively coupling said two parts for movement in unison, and means responsive to sensing movement of said first part for causing energization of said solenoid.

13. In a calculating machine, a register, registration control means including a plural order keyboard and cyclically operable actuating means, a motor, means including a clutch for controlling transmission of power from said motor to said actuating means, means for causing engagement of said clutch including a solenoid, a latch in each order of said keyboard adapted to be displaced from normal position upon depression of a key in the associated order and returned to said position to latch down the key depressed, means cooperating with said latches and operative when a plurality of keys in different orders of said keyboard are depressed at the same time for sensing when all of said depressed keys are latched down, and means controlled by said sensing means for causing energization of said solenoid.

14. In a calculating machine, a plural order register; a plural order keyboard; an adjustable registration sign determining mechanism; actuating means; a source of power; coupling means for transmitting power from said source of power to said actuating means for operating said actuating means to effect entry in said register of a value set in said keyboard; means for adjusting said sign determining mechanism; additive operation initiating means including a magnetic device adapted, when conditioned for operation, to respond to depression of a key in said keyboard for effecting adjustment of said sign determining mechanism for additive registration, and operation of said actuating means by said source of power and said coupling means; subtractive operation initiating means including a magnetic device adapted, when conditioned for operation, to respond to depression of a key in said keyboard for effecting adjustment of said sign determining mechanism for subtractive registration, and operation of said actuating means by said source of power and said coupling means; and a selector switch optionally settable to either of two positions to be in electrical circuit respectively with and to thereby condition for operation the magnetic device of either of said operation initiating means.

15. In a calculating machine, a plural order register; a plural order keyboard; an adjustable registration sign determining mechanism; actuating means; a source of power; coupling means for transmitting power from said source of power to said actuating means for operating said actuating means to effect entry in said register of a value set in said keyboard; means for adjusting said sign determining mechanism; additive operation initiating means including a magnetic device adapted, when energized, to effect adjustment of said sign determining mechanism for additive registration, and operation of said actuating means by said source of power and said coupling means; subtractive operation initiating means including a magnetic device adapted, when energized, to effect adjustment of said sign determining mechanism for subtractive registration, and operation of said actuating means by said source of power and said coupling means; a selector switch optionally settable to either of two positions to be in electrical circuit with the magnetic device of either of said operation initiating means; another switch in the circuit selected by said selector switch in either of its set positions; and means actuatable by depression of a key in said keyboard for closing said other switch.

16. In a calculating machine, a plural order register; a plural order keyboard; an adjustable registration sign determining mechanism; actuating means; a source of power for operating said actuating means to effect entry in said register of a value set in said keyboard; means for adjusting said sign determining mechanism; additive operation initiating means including a magnetc device adapted, when conditioned for operation, to respond to depression of a key in said keyboard for effecting adjustment of said sign determining mechanism for additive registration, and operation of said actuating means by said source of power; subtractive operation initiating means including a magnetic device adapted, when conditioned for operation, to respond to depression of a key in said keyboard for effecting adjustment of said sign determining mechanism for subtractive registration, and operation of said actuating means by said source of power; a selector switch for controlling the conditioning of said two operation initiating means, settable to a neutral position in which it conditions neither of said operation initiating means for operation in response to depression of a key in said keyboard, or to either of two other positions to condition a selected one of said operation initiating means for such operation; and plus and minus registration control keys respectively operative mechanically upon the additive operation initiating means and the subtractive operation initiating means when said switch is set in neutral position for causing operation to be initiated additively or subtractively, according to which registration control key is depressed.

17. In a calculating machine, a plural order register; a plural order keyboard; actuating means; a source of power; coupling means for transmitting power from said source of power to said actuating means for operating said actuating means to effect entry in said register of a value set in said keyboard; operation initiating means including a magnetic device adapted, when said device is energized, to effect operation of said actuating means by said source of power and said coupling means; a member in each order of said keyboard adapted to be displaced from normal position upon depression of a key in the associated order and returned to said position when the key has been completely depressed; means common to all said members having a first movement imparted thereto by displacement of any of said members from its normal position and having a second movement imparted thereto following said first movement when all said members are disposed in their normal positions; and means responsive to movement of said common means for causing energization of said magnetic device when said second movement occurs.

18. In a calculating machine, a plural order register; a plural order keyboard; actuating means; a source of power; coupling means for transmitting power from said source of power to said actuating means for operating said actuating means to effect entry in said register of a value set in said keyboard; operation initiating means including a magnetic device adapted, when said device is energized, to effect operation of said actuating means by said source of power and said coupling means; a latch in each order of said keyboard adapted to be displaced from normal position upon depression of a key in the associated order and returned to said position to latch down the key depressed; means common to all said latches having a first movement imparted thereto by displacement of any of said latches from its normal position and having a second movement imparted thereto following said first movement when all displaced latches have returned to their normal positions; and means responsive to movement of said common means for causing energization of said magnetic device when said second movement occurs.

19. In a calculating machine, a plural order register; a plural order keyboard; actuating means; a source of power; coupling means for transmitting power from said source of power to said actuating means for operating said actuating means to effect entry in said register of a value set in said keyboard; operation initiating means including a magnetic device adapted, when said device is energized, to effect operation of said actuating means by said source of power and said coupling means; a latch in each order of said keyboard adapted to be displaced from normal position upon depression of a key in the associated order and returned to said position to latch down the key depressed; a two-part sensing device comprising a first part cooperating with the units order latch for sensing when a key in the units order has been depressed and latched down, and a second part cooperating with the latches in all orders other than the units order for sensing when a key in said other orders has been depressed and when all latches in said other orders are in their normal positions; means for selectively coupling said two parts for movement in unison; and means responsive to sensing movement of said first part for causing energization of said magnetic device.

20. In a calculating machine, a register, registration control means including a plural order keyboard, and cyclically operable actuating means, a motor, means including a clutch for controlling transmission of power from said motor to said actuating means, means for engaging said clutch, spring-urged means for actuating said clutch-engaging means, a latch for restraining said spring-urged means, and electromagnetic means responsive to depression of a key in the units order of said keyboard for releasing said latch.

21. In a calculating machine, a register, registration control means including a plural order keyboard, and cyclically operable actuating means, a motor, means including a clutch for controlling transmission of power from said motor to said actuating means, means for engaging said clutch, spring-urged means for actuating said clutch-engaging means, a latch for restraining said spring-urged means, an operation control key operable to release said latch, and electromagnetic means adapted to be made responsive to depression of a key in the units order of said keyboard for releasing said latch.

22. In a calculating machine, a register, registration control means including a plural order keyboard, an adjustable registration sign control, and cyclically operable actuating means, a motor, means including a clutch for controlling transmission of power from said motor to said actuating means, solenoid means for causing adjustment of said sign control to condition the machine to enter a value with a selected sign character and for causing engagement of said clutch, a slide in the units order of said keyboard adapted to be moved upon depression of any key in the units order, switch means in circuit with said solenoid means adapted to be operated upon movement of said slide whereby depression of any key in the units order causes energization of said solenoid means, adjustment of said sign control and engagement of said clutch, settable means positionable in either of two set positions for determining the sign character selected by adjustment of said sign control when said switch means is operated by movement of said slide effected by depression of said units order key, and means for releasably maintaining said settable means in either of its said set positions.

23. In a calculating machine, a register, registration control means including a plural order keyboard, an adjustable registration sign control, and cyclically operable actuating means, a motor, means including a clutch for controlling transmission of power from said motor to said actuating means, solenoid means for causing adjustment of said sign control to condition the machine to enter a value with a selected sign character and for causing engagement of said clutch, a latch slide for the keys in the units order of said keyboard, each key in the units order having a cam for moving said latch slide, a second slide disposed below said latch slide and adapted to be moved by the cam on any key in the units order upon depression of the key below the position at which said latch slide will latch said key, switch means in circuit with said solenoid means adapted to be operated upon movement of said second slide whereby depression of any key in the units order beyond its normal latched position causes energization of said solenoid means, adjustment of said sign control and engagement of said clutch, settable means positionable in either of two set positions for determining the sign character selected by adjustment of said sign control when said switch means is operated by movement of said second slide effected by depression of said units order key, and means for releasably maintaining said settable means in either of its said set positions.

24. In a calculating machine, a register, registration control means including a plural order keyboard, an adjustable registration sign control, and cyclically operable actuating means, a motor, means including a clutch for controlling transmission of power from said motor to said actuating means, solenoid means for causing adjustment of said sign control to condition the machine to enter a value with a selected sign character and for causing engagement of said clutch, a slide in the units order of said keyboard adapted to be moved upon depression of any key in the units order, switch means in circuit with said solenoid means adapted to be operated upon movemnet of said slide whereby depression of any key in the units order causes energization of said solenoid means, adjustment of said sign control and engagement of said clutch, settable means positionable in either of two set positions for determining the sign character selected by adjustment of said sign control when said switch means is operated by movement of said slide effected by depression of said units order key, means for releasably maintaining said settable means in either of its said set positions, a separate switch in parallel with said switch means, and a bar disposed in front of said keyboard and being depressible for operating said separate switch.

25. In a calculating machine, a register, registration control means including a plural order keyboard, an adjustable registration sign control, and cyclically operable actuating means, a motor, means including a clutch for controlling transmission of power from said motor to said actuating means, solenoid means for causing adjustment of said sign control to condition the machine to enter a value with a selected sign character and for causing engagement of said clutch, a latch adapted to be displaced from normal position upon depression of any key in the units order and returned to normal position to latch down the depressed key, a slide in the units order of said keyboard adapted to be moved upon depression of any key in the units order, switch means in circuit with said solenoid means and comprising a first switch controlled by said latch and normally closed only when said latch is in normal position and a second switch connected in series with said first switch and being controlled by said slide and normally open only when said slide is in its normal position whereby depression of any key in the units order causes energization of said solenoid means, adjustment of said sign control and engagement of said clutch, settable means positionable in either of two set positions for determining the sign character selected by adjustment of said sign control when said switch means is operated by movement of said latch and said slide effected by depression of said units order key, and means for releasably maintaining said settable means in either of its said set positions.

26. In a calculating machine, a register, registration control means including a plural order keyboard, an adjustable registration sign control, and cyclically operable actuating means, a motor, means including a clutch for controlling transmission of power from said motor to said actuating means, solenoid means for causing adjustment of said sign control to condition the machine to enter a value with a selected sign character and for causing engagement of said clutch, a latch adapted to be displaced from normal position upon depression of any key in the units order and returned to normal position to latch down the depressed key, a slide in the units order of said keyboard adapted to be moved upon depression of any key in the units order before the key is latched and which is maintained displaced while the key is latched down, switch means in circuit with said solenoid means and comprising a first switch controlled by said latch and normally closed only when said latch is in normal position and a second switch connected in series with said first switch and being controlled by said slide and normally open only when said slide is in its normal position whereby depression of any key in the units order causes energization of said solenoid means, adjustment of said sign control and engagement of said clutch, settable means positionable in either of two set positions for determining the sign character selected by adjustment of said sign control when said switch means is operated by movement of said latch and said slide effected by depression of said units order key, and means for releasably maintaining said settable means in either of its said set positions.

27. In a calculating machine, a register, registration control means including a plural order keyboard, an adjustable registration sign control, and cyclically operable actuating means, a motor, means including a clutch for controlling transmission of power from said motor to said actuating means, solenoid means for causing adjustment of said sign control to condition the machine to enter a value with a selected sign character and for causing engagement of said clutch, a latch adapted to be displaced from normal position upon depression of any key in the units order and returned to normal position to latch down the depressed key, a slide in the units order of said keyboard adapted to be moved upon depression of any key in the units order before the key is latched and which is maintained displaced while the key is latched down, switch means in circuit with said solenoid means and comprising a first switch controlled by said latch and normally closed only when said latch is in normal position and a second switch connected in series with said first switch and being controlled by said slide and normally open only when said slide is in its normal position whereby depression of any key in the units order causes energization of said solenoid means, adjustment of said sign control and engagement of said clutch, settable means positionable in either of two set positions for determining the sign character selected by adjustment of said sign control when said switch means is operated by movement of said latch and said slide effected by depression of said units order key, means for releasably maintaining said settable means in either of its said set positions, a normally open third switch, means operated by said actuating means for holding said third switch closed in the full cycle position of said actuating means, and means connecting said third switch in series with said first and second switches.

28. In a calculating machine, a register, registration control means including a plural order keyboard, an adjustable registration sign control, and cyclically operable actuating means, a motor, means including a clutch for controlling transmission of power from said motor to said actuating means, solenoid means for causing adjustment of said sign control to condition the machine to enter a value with a selected sign character and for causing engagement of said clutch, a slide in the units order of said keyboard adapted to be moved upon depression of any key in the units order, switch means in circuit with said solenoid means adapted to be operated upon movement of said slide whereby depression of any key in the units order causes energization of said solenoid means, adjustment of said sign control and engagement of said clutch, settable means positionable in either of two set positions for determining the sign character selected by adjustment of said sign control when said switch means is operated by movement of said slide effected by depression of said units order key, and being settable in a third set position for rendering operation of said switch means ineffective for causing energization of said solenoid means, means for releasably maintaining said settable means in any of its said set positions, a separate operation control key, and means operable by said operation control key for effecting energization of said solenoid means when said settable means is in said third position.

GEORGE W. HOPKINS.

REFERENCES CITED

The following references are of record in the file of this patent:

UNITED STATES PATENTS

| Number | Name | Date |
| --- | --- | --- |
| 1,136,725 | Shiek | Apr. 20, 1915 |
| 1,514,954 | Crumpton | Nov. 11, 1924 |
| 1,808,213 | Eichenauer | June 2, 1931 |
| 1,849,169 | Britten, Jr. | Mar. 15, 1932 |
| 1,877,802 | Britten, Jr. | Sept. 20, 1932 |
| 2,117,620 | Matni | May 17, 1938 |
| 2,121,683 | Britten, Jr. | June 21, 1938 |
| 2,152,199 | Machado | Mar. 28, 1939 |
| 2,229,553 | Crosman | Jan. 21, 1941 |
| 2,279,455 | Friden | Apr. 14, 1942 |
| 2,396,188 | Mehan et al. | Mar. 5, 1946 |